(12) United States Patent
Berger et al.

(10) Patent No.: US 8,239,290 B2
(45) Date of Patent: Aug. 7, 2012

(54) GRAPHICAL USER INTERFACE, SYSTEM AND METHOD FOR MANAGING CONTACTS WITHIN AN ONLINE STATIONERY SYSTEM

(75) Inventors: Kelly Berger, Los Altos, CA (US);
Adnan Asar, Sunnyvale, CA (US);
Kevin Chang, Sunnyvale, CA (US);
Krys Taylor, Sunnyvale, CA (US);
Bryan Wu, San Francisco, CA (US);
Dimitre Piskyulev, Santa Clara, CA (US)

(73) Assignee: Shutterfly, Inc., Redwood City, CA (US)

( * ) Notice: Subject to any disclaimer, the term of this patent is extended or adjusted under 35 U.S.C. 154(b) by 383 days.

(21) Appl. No.: 12/638,844

(22) Filed: Dec. 15, 2009

(65) Prior Publication Data
US 2011/0145099 A1      Jun. 16, 2011

(51) Int. Cl.
*G06Q 30/00*      (2012.01)
*G06F 17/00*      (2006.01)

(52) U.S. Cl. ................... 705/27.1; 700/235; 700/233

(58) Field of Classification Search ............ 705/27.1, 705/500; 700/233, 235
See application file for complete search history.

(56) References Cited

U.S. PATENT DOCUMENTS

| | | | |
|---|---|---|---|
| 5,552,994 A | | 9/1996 | Cannon et al. |
| 5,600,563 A | | 2/1997 | Cannon et al. |
| 5,748,484 A | | 5/1998 | Cannon et al. |
| 5,751,590 A | | 5/1998 | Cannon et al. |
| 5,993,048 A | * | 11/1999 | Banks et al. .................. 700/233 |
| 6,092,054 A | * | 7/2000 | Tackbary et al. ............ 705/26.1 |
| 7,983,792 B2 | * | 7/2011 | Gombert et al. ............... 700/233 |
| 2003/0221162 A1 | * | 11/2003 | Sridhar ...................... 715/501.1 |
| 2004/0107125 A1 | | 6/2004 | Guheen et al. |
| 2005/0071296 A1 | * | 3/2005 | Lepkofker .................... 705/410 |
| 2006/0178918 A1 | | 8/2006 | Mikurak |
| 2006/0190808 A1 | | 8/2006 | Balthaser |
| 2006/0221162 A1 | * | 10/2006 | Naruse et al. ................. 347/104 |
| 2006/0251223 A1 | * | 11/2006 | Vitikainen et al. ............ 379/67.1 |
| 2008/0249657 A1 | * | 10/2008 | Wendland et al. ............ 700/235 |
| 2008/0306884 A1 | * | 12/2008 | Weinberg et al. ............. 705/410 |

(Continued)

FOREIGN PATENT DOCUMENTS

AU      675344      2/1995

(Continued)

OTHER PUBLICATIONS

Anon., "The Learning Company's Broderbund Products Offer Creative and Inexpensive Holiday Gift Ideas," PR Newswire, Nov. 29, 2000.*

(Continued)

*Primary Examiner* — Nicholas D Rosen
(74) *Attorney, Agent, or Firm* — Xin Wen

(57) ABSTRACT

A graphical user interface, system and method are described for managing a contacts database within an online stationery service. For example, one embodiment of the invention comprises a graphical user interface comprising: a first region for displaying the listing of contacts received from the stationery service contacts manager, the contacts within the listing of contacts selectable via a user input device; a second region comprising a series of data field for entering a new contact via a user input device; a third region displaying a list of contacts to whom the online stationery service will mail stationery directly on behalf of the end user, the contacts within the third region selected from the first region or entered in the second region; and a print module to generate a print job to print the personalized stationery and envelopes containing the address information for the user-selected contacts.

14 Claims, 25 Drawing Sheets

U.S. PATENT DOCUMENTS

| | | | |
|---|---|---|---|
| 2011/0141493 A1* | 6/2011 | Berger et al. | 358/1.6 |
| 2011/0145097 A1* | 6/2011 | Berger et al. | 705/27.1 |
| 2011/0145098 A1* | 6/2011 | Berger et al. | 705/27.1 |
| 2011/0145101 A1* | 6/2011 | Berger et al. | 705/27.1 |
| 2011/0145342 A1* | 6/2011 | Berger et al. | 709/206 |
| 2011/0314111 A1* | 12/2011 | Wang et al. | 709/206 |

FOREIGN PATENT DOCUMENTS

| | | |
|---|---|---|
| CA | 2166963 | 1/1995 |
| JP | 2002099490 A * | 4/2002 |

OTHER PUBLICATIONS

Anon., "Language Masters Launches International Greeting Cards," PR Newswire, Nov. 10, 2003.*

Horowitz, E., "A Holiday Guide for Geeks a Holiday Guide for Geeks," The Virginian Pilot, p. D4, Dec. 8, 2008.*

Anon. "ePlanet Invests in Greetz," Business Wire, Mar. 30, 2009.*

* cited by examiner

GRAPHICAL USER INTERFACE, SYSTEM AND METHOD FOR MANAGING CONTACTS WITHIN AN ONLINE STATIONERY SYSTEM

BACKGROUND

1. Field of the Invention

This invention relates generally to the field of network data processing systems. More particularly, the invention relates to an improved graphical user interface, architecture and method for managing contacts within an online stationery system.

2. Description of the Related Art

Web-based systems for designing stationery such as wedding invitations, birth announcements, thank you cards, birthday party invitations, etc, are currently available over the Internet. These services allow a user to enter a personalized message on a stationery template via a Web browser. The service then prints the stationery with the personalized message and mails the printed stationery and envelopes to the end user. The end user then mails the stationery to one or more recipients.

Some online stationery services will also mail stationery directly to recipients on behalf of the end user. In order to do so, the user must provide the stationery service with the names and addresses of the recipients. FIGS. 1a-c illustrate screenshots from one particular stationery Website (www.greetz.com) which provides options for manually entering a new name/address of a recipient 100 or importing a group of addresses from an Excel spreadsheet 101. As illustrated in FIG. 1b, upon selecting an Excel spreadsheet from the user's local hard drive, the user is prompted with a plurality of drop-down menus 102 to identify the data fields for the address lines. Once the import is complete, a list of recipients 103 is provided as shown in FIG. 1c. The end user is permitted to delete names from the list (by selecting a trash icon) but no other mechanism is provided for editing or otherwise managing the list of recipients on the online stationery service.

Consequently, what is needed is an improved graphical user interface system and method for importing and managing contacts within an online stationery service.

SUMMARY

A graphical user interface, system and method are described for managing a contacts database within an online stationery service. For example, one embodiment of the invention comprises a system implemented within an online stationery service, the system comprising at least one memory for storing program code and at least one processor for processing the program code to execute: a stationery service contacts manager to manage a set of contacts data within a stationery service contacts database in response to user input; a stationery personalization engine providing an end user with a set of selectable stationery templates, the stationery personalization engine receiving an indication that an end user has selected a particular one of the stationery templates, and generating personalized stationery with the selected template based on user input; presentation logic for generating a graphical user interface (GUI), the presentation logic communicatively coupled to the stationery service contacts manager to receive a listing of contacts from the stationery service contacts manager to whom the personalized stationery will be mailed, the graphical user interface comprising: a first region for displaying the listing of contacts received from the stationery service contacts manager, the contacts within the listing of contacts selectable via a user input device; a second region comprising a series of data field for entering a new contact via a user input device; a third region displaying a list of contacts to whom the online stationery service will mail stationery directly on behalf of the end user, the contacts within the third region selected from the first region or entered in the second region; and a print module to generate a print job to print the personalized stationery and envelopes containing the address information for the user-selected contacts.

BRIEF DESCRIPTION OF THE DRAWINGS

A better understanding of the present invention can be obtained from the following detailed description in conjunction with the following drawings, in which:

FIG. 6 illustrates a graphical user interface for associating imported contacts with data fields.

FIGS. 16a-b illustrate exemplary address confirmation requests transmitted to contacts in one embodiment of the invention.

DETAILED DESCRIPTION OF PREFERRED EMBODIMENTS

Described below is a system and method for importing and managing contacts in an online stationery system. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

It should be noted that the term "stationery" is used herein to refer to cards, invitations (e.g., wedding, birthday invitations, etc), and any other form of written communication and/or images printed on a medium (e.g., paper, fabric, etc) using any form of printing device.

Figure 1A:
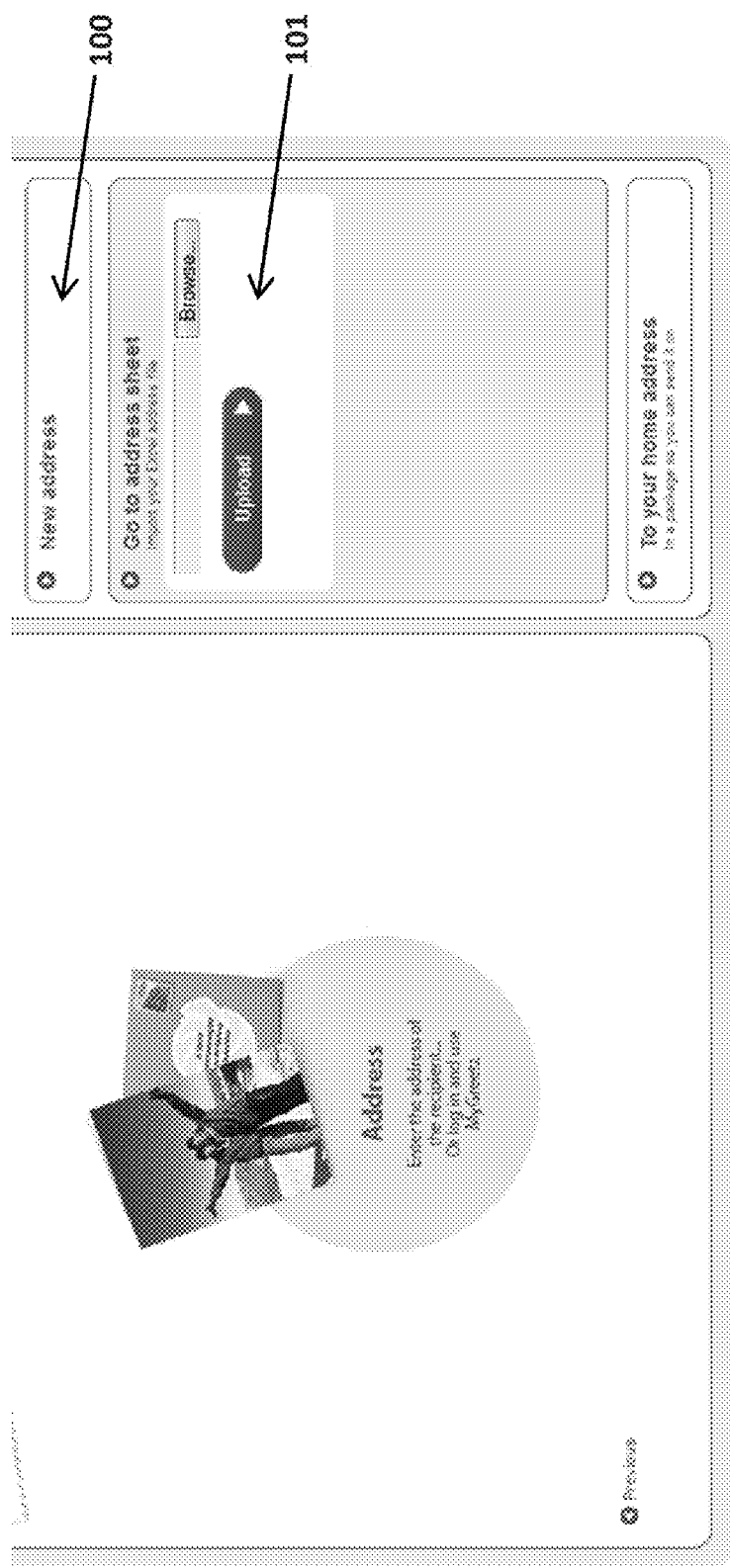
FIGS. 1a-c illustrates a prior art stationery service in which stationery recipients are identified.
Figure 1B:
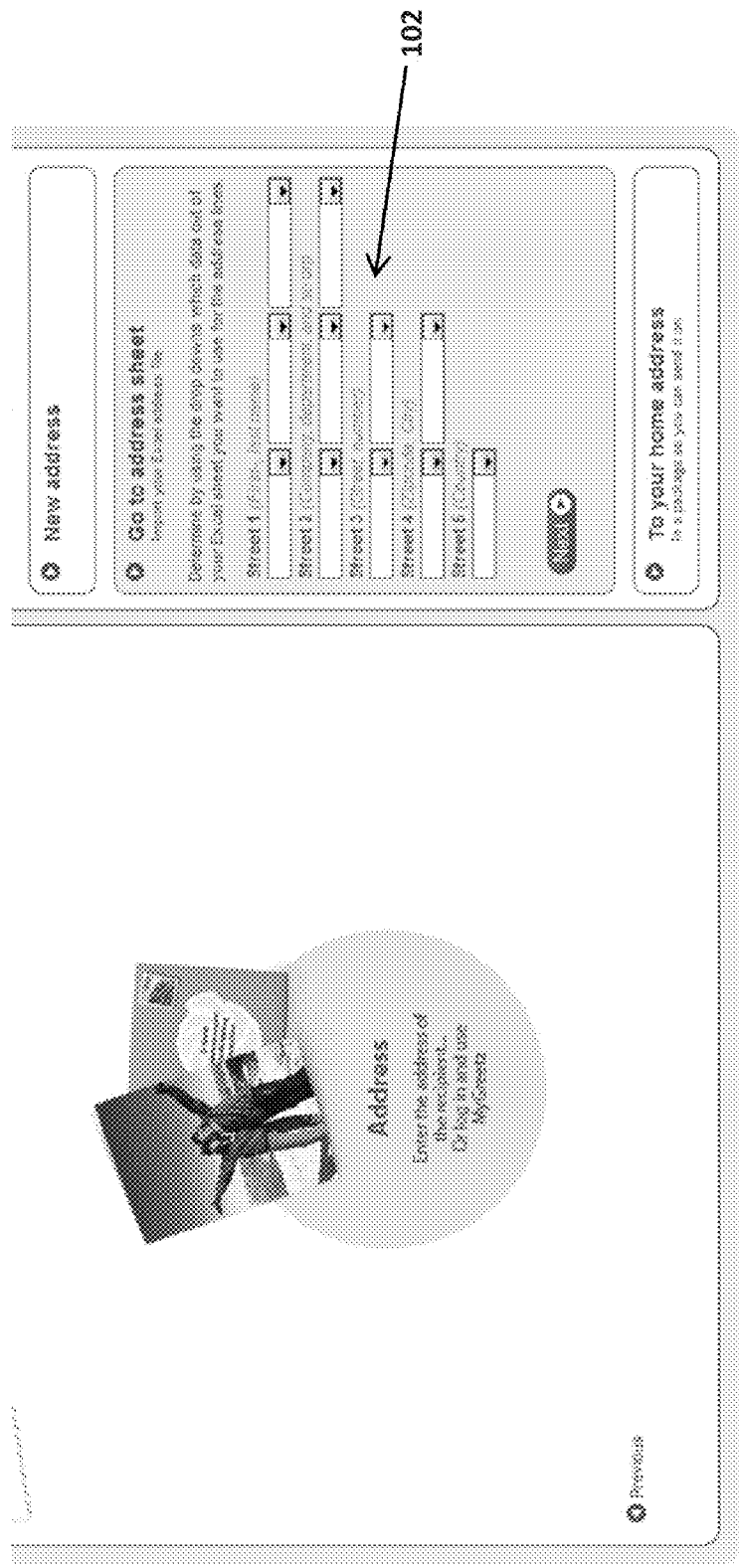
Figure 1C:
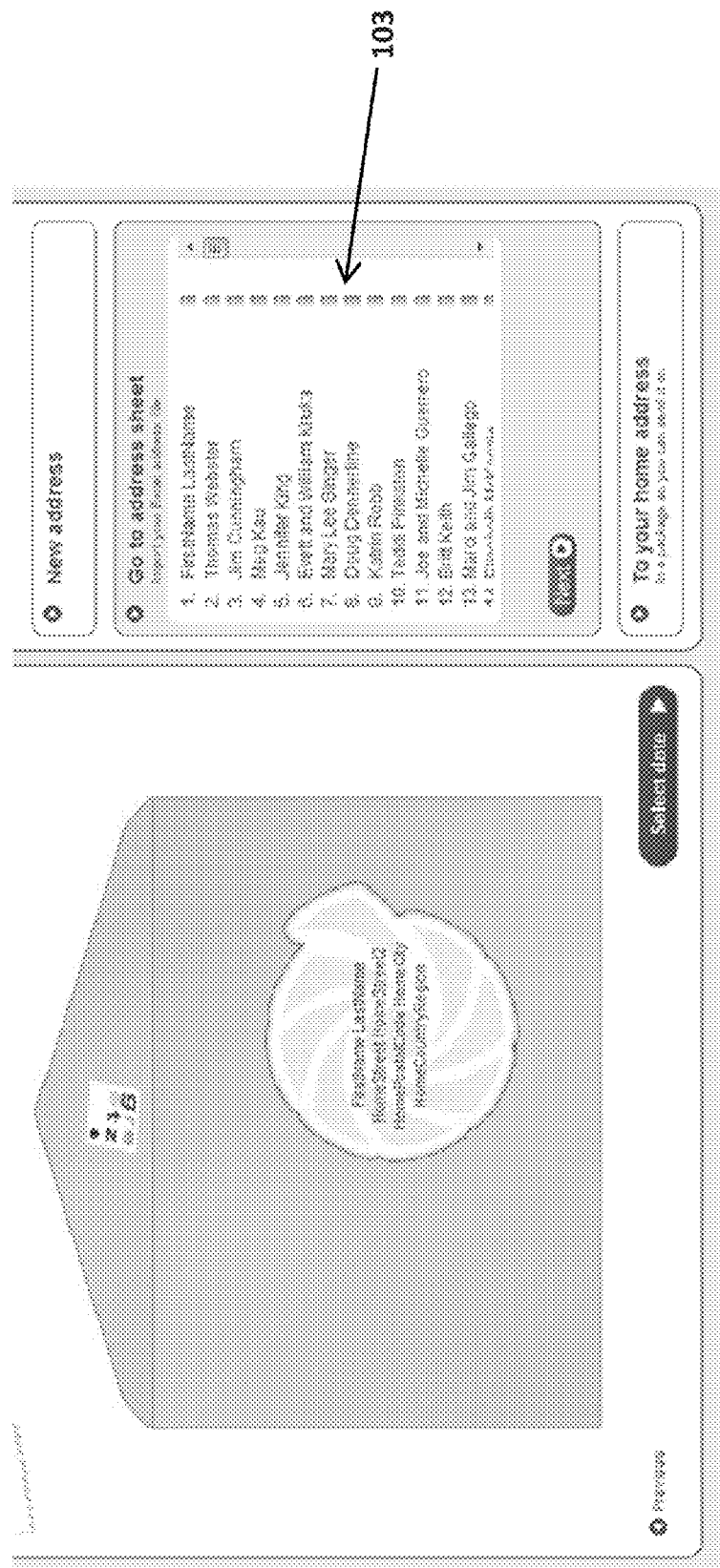
Figure 2:
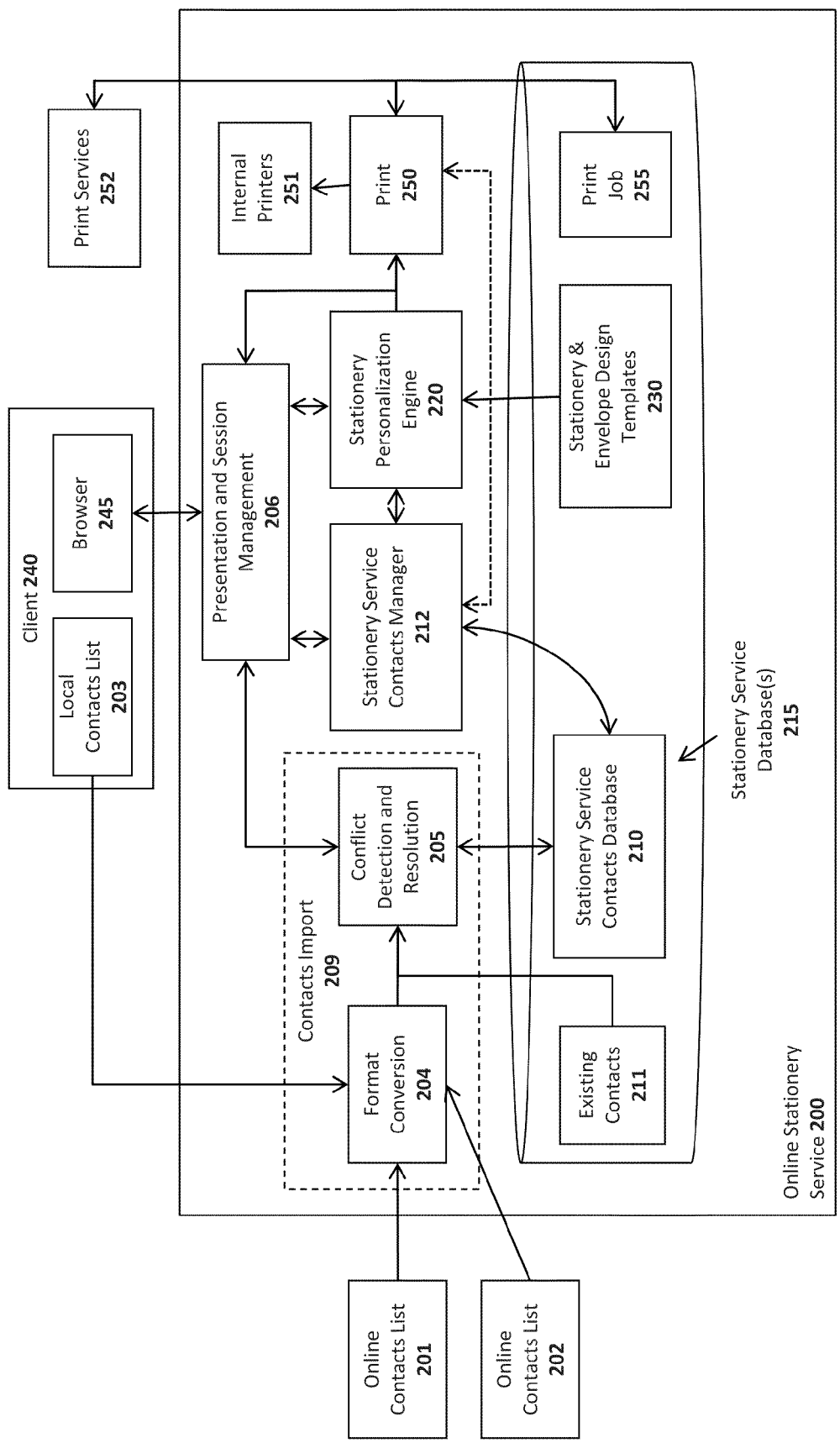
FIG. 2 illustrates a system architecture according to one embodiment of the invention.
Figure 3:
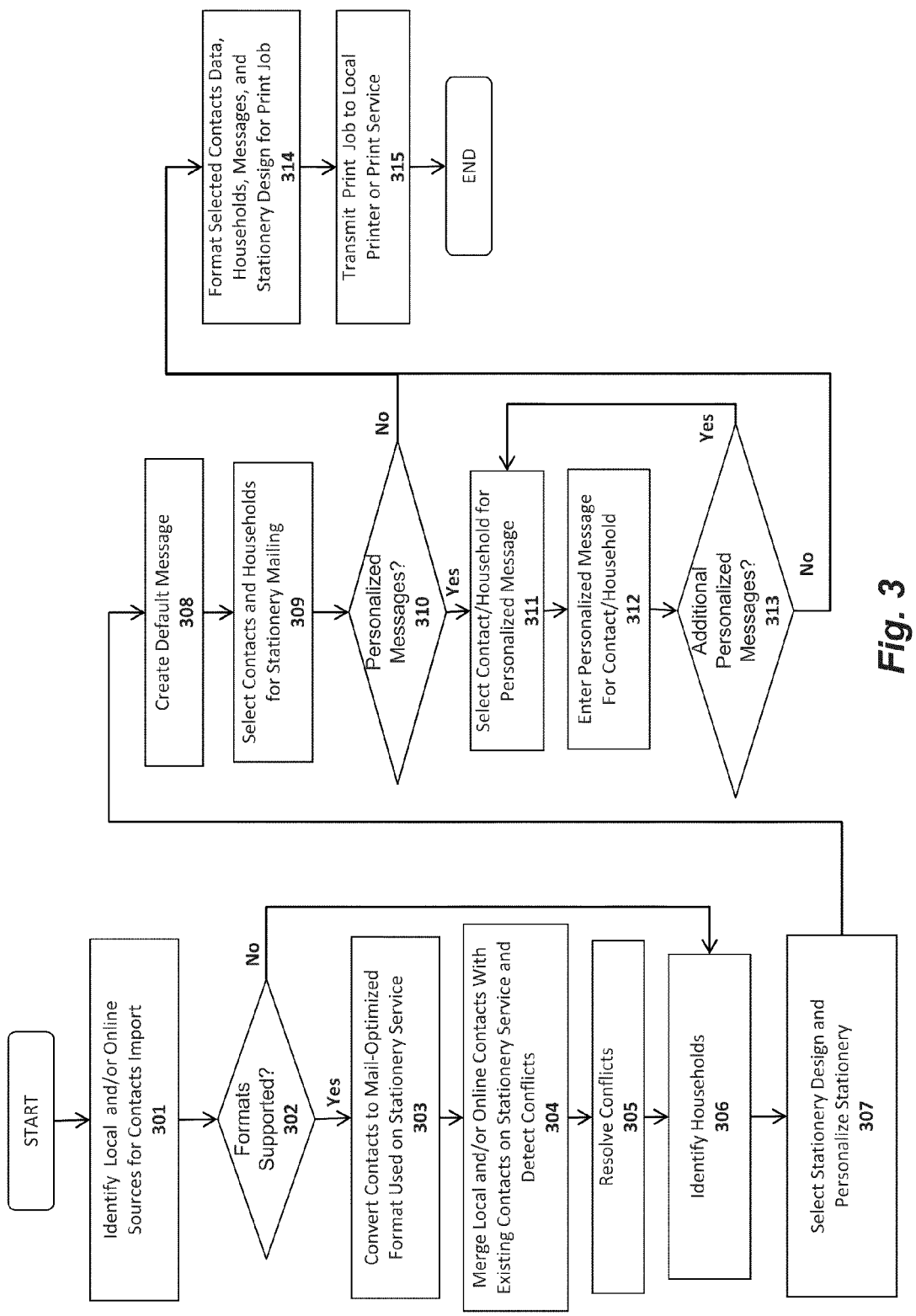
FIG. 3 illustrates a computer-implemented method according to one embodiment of the invention.

FIG. 2 illustrates one embodiment of a system architecture for importing and managing contacts within an online stationery service 200 and FIG. 3 illustrates a corresponding method. One embodiment of the online stationery service 200 merges contact data from multiple different sources and then converts the contact data into a format which is optimized for online stationery mailing functions. A brief overview of the method illustrated in FIG. 3 will now be provided within the context of the architecture shown in FIG. 2. It should be noted, however, that the underlying principles of the invention are not limited to the specific architecture shown in FIG. 2.

At 301, a contacts import module 209 manages the importation of contacts from various local and/or online contact database identified by the end user. In the illustrated embodiment, the contacts import module 209 comprises a format conversion module 204 and a conflict detection and resolution module 205. As shown in FIG. 2, the format conversion module 204 reads contacts data from online contacts databases 201-202; local contacts databases 203 (i.e., "local" to the user's client computer 240); and/or existing contacts 211 already stored on the online stationery service 200 (e.g., the end user may have already established an account on the online stationery service 200 to send stationery and may have entered information for a set of contacts 211). If the online/local contact formats are supported, determined at 302, then at 303, the format conversion module converts the contacts to a format optimized for use on an online stationery service 200. To perform the format conversion, the format conversion module 204 parses the contact data in source data structure (e.g., the CSV file, vCard file, etc), extracts the data, and assigns the data to appropriate data fields in the new data structure. Various well known techniques for converting data from one format to another may be employed by the format conversion module 204. Once converted (and following conflict detection described below), the contacts data is stored in its new format within a contacts database 210 on the stationery service. Various features associated with this new data format are described in detail below (see, e.g., FIGS. 12-20c and associated text).

At 304, a conflict detection and resolution module 205 merges the local and/or online contacts with existing contacts 211 already stored on the online stationery service 200 and detects any conflicts which may result from the merge operation. A conflict may result if one or more contacts being imported are already stored within the existing contacts database 211. In such a case, the conflict detection and resolution module 205 resolves the conflicts at 305 using a set of conflict resolution rules (described below). Once all conflicts have been resolved, the data is persisted within the contacts database 210 and made accessible to end users via the stationery service contacts manager 212. In one embodiment, the contacts database 210 is implemented using mySQL. However, various different database formats may be employed while still complying with the underlying principles of the invention (e.g., Microsoft SQL, IBM SQL, etc).

At 307, the user identifies one or more "households" within the stationery service contacts database 210. As described below, households are specialized groups of contacts who live at the same address. The concept of a "household" is a particularly useful abstraction for an online stationery service 200 which mails stationery on behalf of a user.

As illustrated in FIG. 2, in one embodiment, all operations to the stationery service contacts database 210 occur through the stationery service contacts manager 212. That is, the stationery service contacts database 210 is used for persistent storage of contacts data containing the features described herein and the stationery service contacts manager 212 is the application-layer program code used to perform operations on the stationery service contacts database 210 as described below. The presentation and session management logic 206 comprises the program code for maintaining user sessions and for dynamically generating Web pages containing (among other things) the graphical user interface (GUI) features for manipulating contacts data as illustrated herein.

Returning to the method of FIG. 3, at 307, the user selects and personalizes a stationery design. In one embodiment, this is accomplished with a stationery personalization engine 220 such as that described in co-pending application entitled SYSTEM AND METHOD FOR DESIGNING AND GENERATING ONLINE STATIONERY, Ser. No. 12/188,721, filed Aug. 8, 2008, which is assigned to the assignee of the present application and which is incorporated herein by reference. In one embodiment, the stationery personalization engine 220 performs all of the functions described in the co-pending application as well as the additional functions described herein (e.g., selecting contacts/households for a stationery mailing via the stationery service contacts manager 212, selecting between a default message or a personal message for the contacts/households, etc).

At 308, the end user creates a default message to be used for a stationery mailing and, at 309, the contacts and/or households for the mailing are identified by the end user. If the user wishes to include a personalized message in lieu of the default message for one or more contacts/households, determined at 310, then the user selects a contact/household at 311 and enters the personalized message for the contact/household at 312. If any additional personalized messages are to be included, determined at 313, then steps 311 and 312 are repeated until all personalized messages have been entered.

At 314, all of the information related to the stationery order, including the selected stationery design, default messages, personalized messages and associated contacts and households are formatted for printing by a print module 250 which generates a print job 255. The formatting may include converting the stationery data mentioned above into a format usable by a particular printer. By way of example, a letter press printer may require different formatting than a digital press printer. In one embodiment, the specifications for the print job are encapsulated as metadata in an Extensible Markup Language ("XML") document and transmitted to an external print service 252. In one embodiment, the XML document includes a hyperlink (e.g., a URL) to the formatted print job 255 on the online stationery service 200. The print service 252 then accesses the print job by selecting the hyperlink. Regardless of how the print job is accessed, at 315, the formatted print job 255 is transmitted to either an internal printer 251 or an external print service 252 (e.g., over the Internet). Once printing is complete, the online stationery service 200 or the print service 252 mails the stationery to the contacts and/or households identified by the end user.

Having provided an overview of the method set forth in FIG. 3 and the architecture illustrated in FIG. 2, various specific details associated with managing contacts, generating print jobs and mailing stationery from an online stationery service 200 will now be provided. It should be noted, however, that the underlying principles of the invention are not limited to the particular architecture shown in FIG. 2 or the particular method set forth in FIG. 3.

In one embodiment, the different graphical user interface (GUI) features described herein are generated by presentation and session management logic 206 executed on the online stationery service. In one embodiment, various well known functional modules associated within the presentation and session management logic 206 are executed to receive input, process the input, interact with one or more other modules shown in FIG. 2, and dynamically generate Web pages containing the results. The Web pages are then transmitted to the user's client computer 240 and rendered on a browser 245. The Web pages may be formatted according to the well known HyperText Markup Language ("HTML") or Extensible HTML ("XHTML") formats, and may provide navigation to other Web pages via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM").

Figure 4:
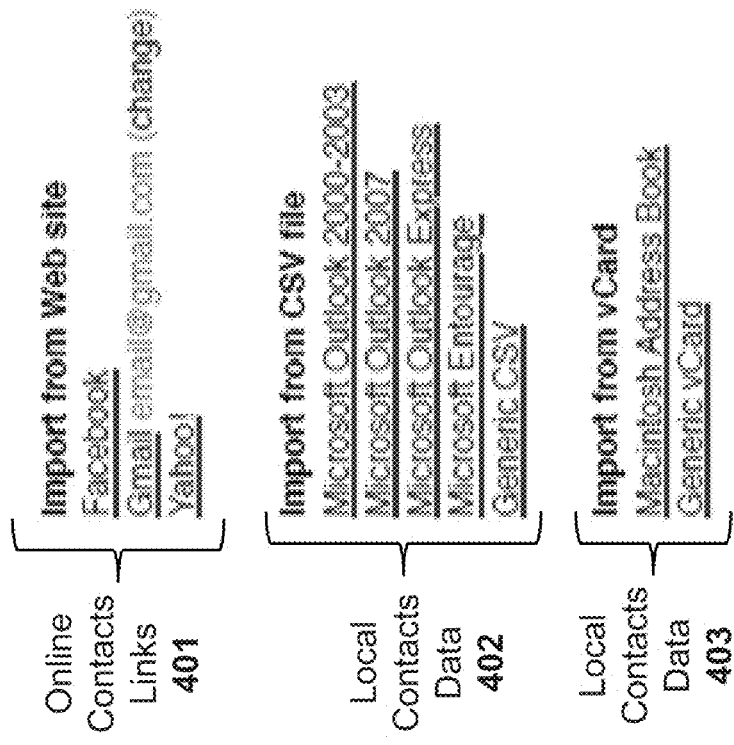
FIG. 4 illustrates a graphical user interface (GUI) for importing various different online and offline contact databases.

Turning now to FIG. 4, in one embodiment, the user is prompted to identify online and offline contacts databases via a series of hyperlinks 401-402 (see, e.g., step 302 in FIG. 3). In the example shown, the three online links 401 include Facebook, Gmail and Yahoo! contacts. A set of five links 402 are provided for importing contacts from different types of CSV files and a set of two links 403 are provided for importing contacts from different vCard files.

In one embodiment, when importing online address books such as those available from Facebook, Gmail and Yahoo!, the user is asked to provide authentication data such as a user name and a password. The online stationery service 200 then uses the authentication data to log in to the online service and retrieve the contacts list on behalf of the user.

Figure 5:
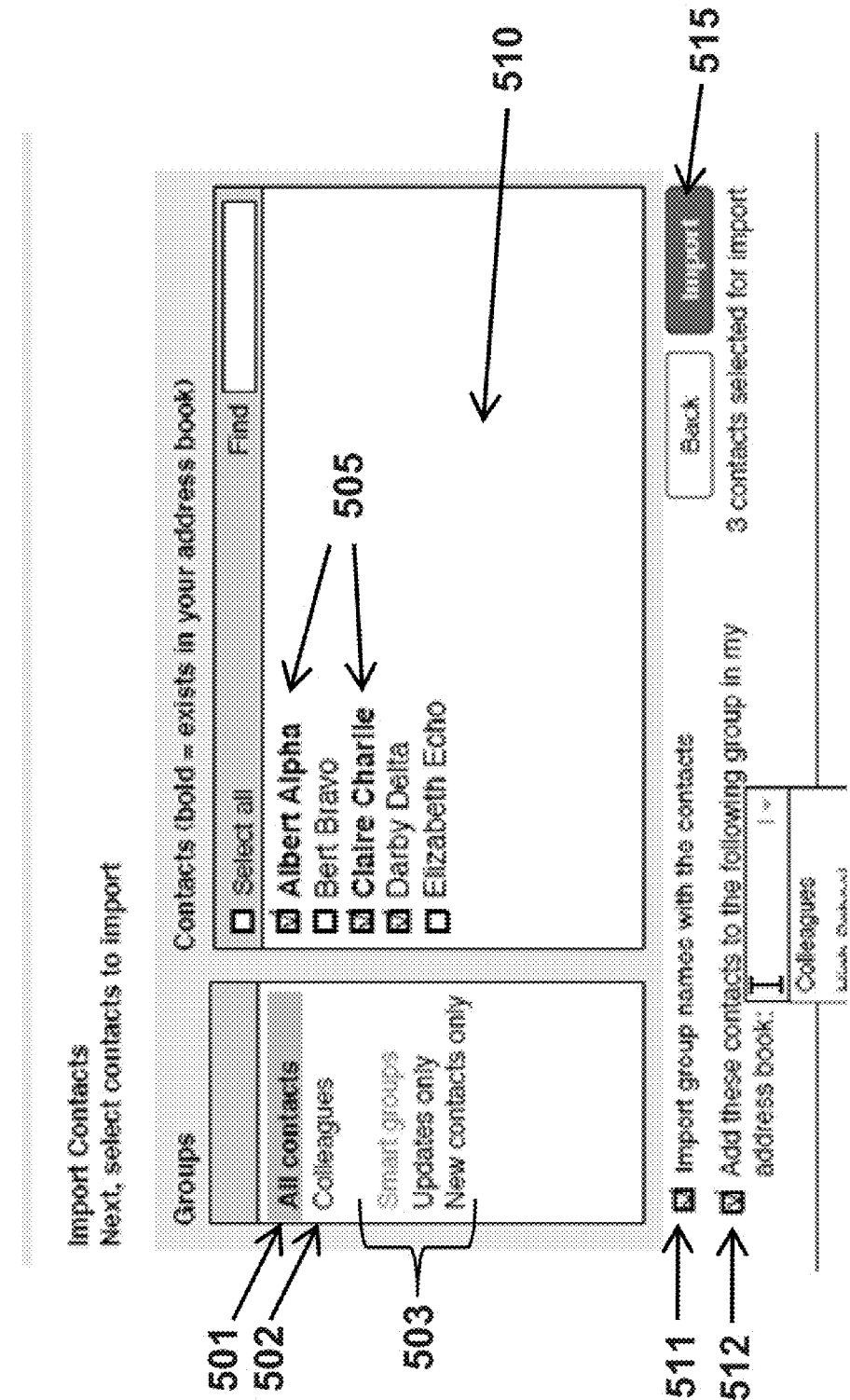
FIG. 5 illustrates one embodiment of a GUI window for importing contacts from different contact groups.

FIG. 5 illustrates a graphical user interface (GUI) window generated in one embodiment of the invention following the selection of a particular contact database 201-203. In one embodiment, the user may select contacts from different, predefined contact groups 501-503. In the example shown in FIG. 5, the groups include "all contacts" 501, "colleagues" 502, and several "smart groups" 503 (described in detail below). A set of available contacts 505 to be imported is displayed within region 510. Each contact has a check box associated with it to indicate whether the contact should be included in (or excluded from) the import. In one embodiment, the default state of the check boxes is "unchecked" and the user must manually select contacts by checking the corresponding check boxes. In addition, in one embodiment, the contacts which correspond to contacts already stored in the user's address book 211 on the online stationery service 200 are identified by the conflict detection and resolution module 205 and highlighted (e.g., bolded in FIG. 5). In one embodiment, "matches" to existing contacts are those contacts which have the same name AND one of the following: same email, phone, date, OR mailing address.

Check-boxes 511 and 512 are also provided to import group names with the contacts and to add the imported contacts to a specific group within the user's existing address book 211. The specific group is identified via a drop-down menu containing a list of available groups. Once the set of contacts are selected within region 510 the user imports the contacts by selecting an import button 515.

Figure 6:
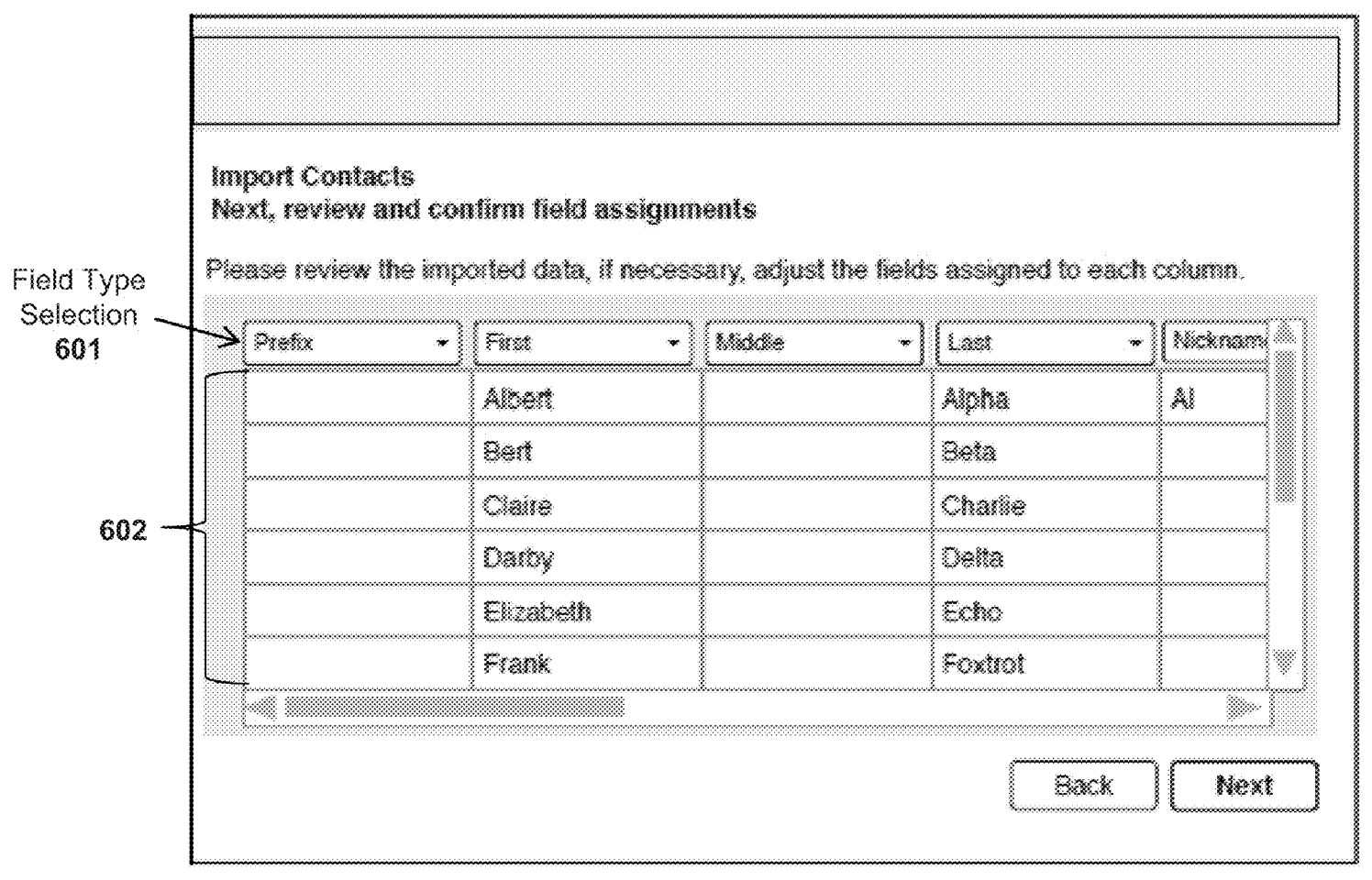

FIG. 6 illustrates a GUI window which allows the user to review and confirm field assignments to be used for the imported contacts data. A plurality of "field type" drop-down menus 601 are provided to allow the user to select the fields to be used. The corresponding values for each contact are displayed within a plurality of rows 602, as illustrated.

Figure 7:
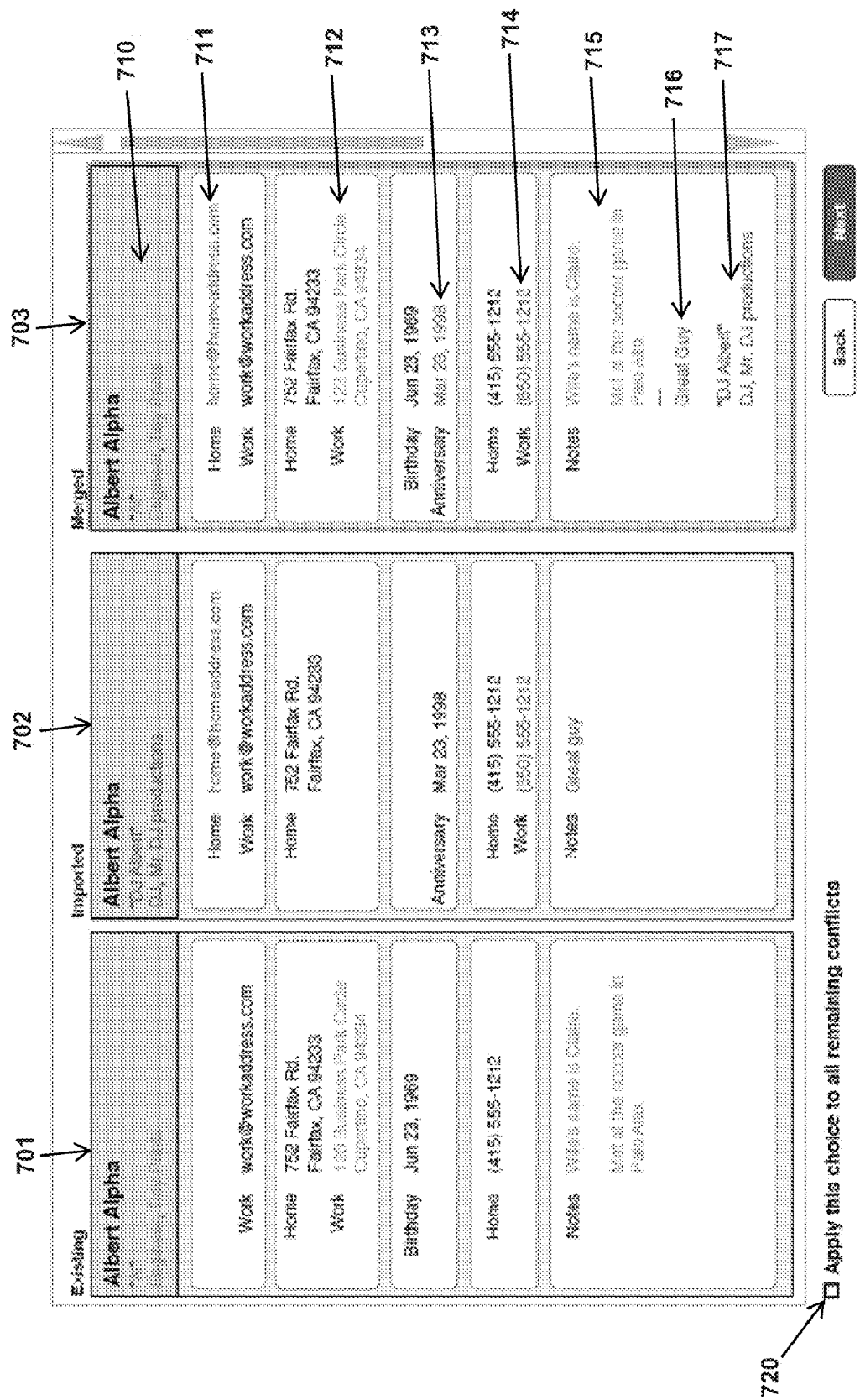
FIG. 7 illustrates one embodiment of the invention for merging existing and imported contacts.

As mentioned above, a conflict detection and resolution module 205 identifies existing contacts 211 which match contacts being imported from the various sources 201-203 and attempts to resolve any conflicts which may exist between the data. In one embodiment, each conflict is identified to the end user and the user is prompted to specify how to resolve the conflict. For example, FIG. 7 illustrates a Web-based graphical user interface presented to the user which shows the contact data contained in the existing contacts database 701, the contact data to be imported 702, and the merged contact data which would result from the import 703. In one embodiment, the differences between the existing and imported data is highlighted. For example, in FIG. 7, data found in the existing database but not the database to be imported is highlighted with a first color (e.g., orange); and data found in the contacts database to be imported but not the existing contacts database is highlighted with a second color (e.g., green). Thus, the merged contact data 703 is shown with some entries 712, 715 highlighted in the first color and some entries 711, 713, 714 highlighted in the second color.

As shown in FIG. 7, some of the conflicting data is combined into corresponding fields within the merged contact 703. For example, in FIG. 7, the "notes" field is appended to include notes 715, 716 from both the existing and the imported contacts. However, certain data fields cannot be merged in this manner. For example, if the existing contact 701 has a different home address than the imported contact 702, then the conflict detection and resolution module 205 must select one of the two addresses as the primary home address. In one embodiment, when a conflict of this nature occurs, the default operation of the conflict detection and resolution module 205 is to keep the data from the existing contact 701 and to append the data from the imported contact into the notes field of the merged contact 703. For example, in FIG. 7, the nickname ("Al"), title ("Engineer") and company ("Tiny Prints") are selected from the existing contact 701 and the nickname ("DJ Albert"), title ("DJ") and company ("Mr. DJ Productions") from the imported contact 702 are appended within the notes field 717 of the merged contact 703.

In one embodiment, the user is given the option to select the existing version 701, the imported version 702 or the merged version 703 using a mouse, keyboard, and/or other cursor control device. A checkbox option 720 is also provided to allow the user to apply the choice to all remaining contacts to be reviewed. If the checkbox 720 is not selected, the user will review and select each conflict individually.

Figure 8:
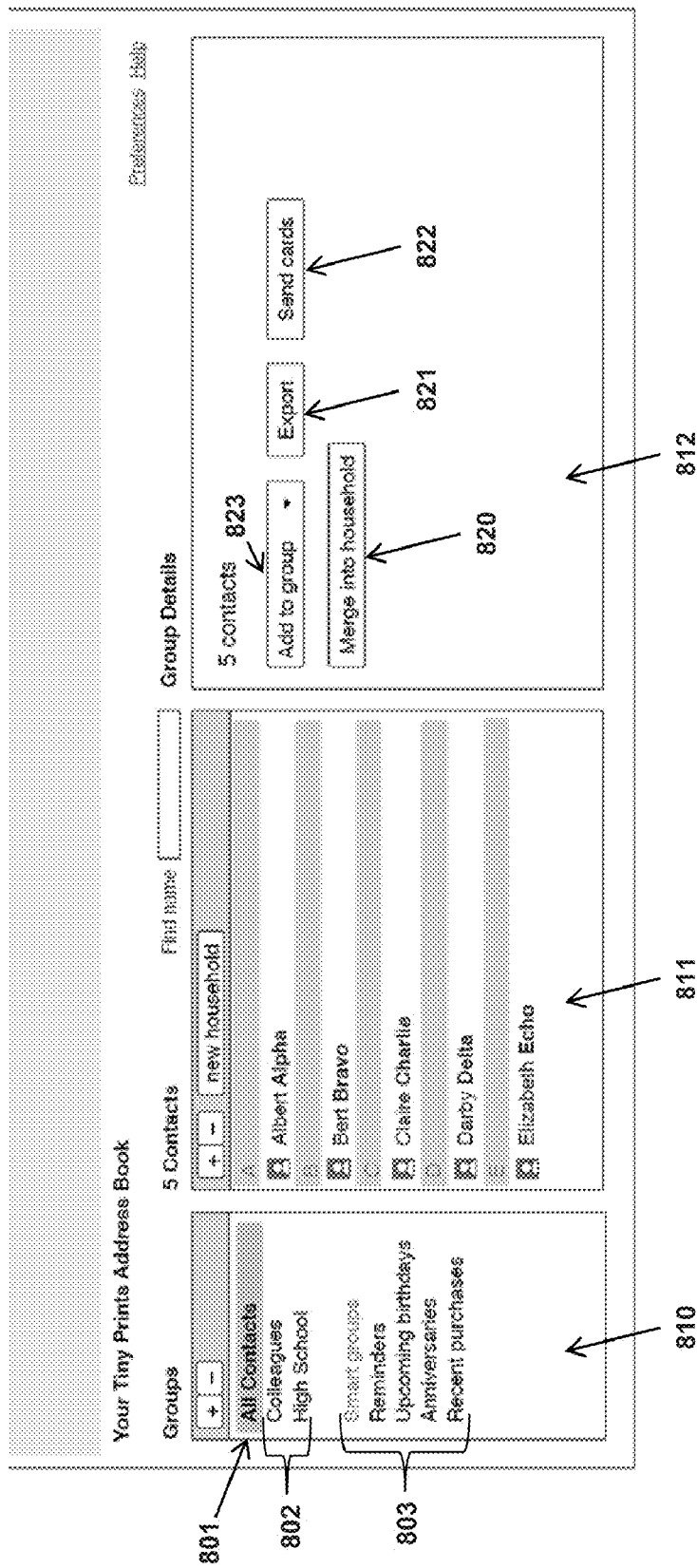
FIG. 8 illustrates one embodiment of an address book for viewing and managing a contacts database.

FIG. 8 illustrates a graphical user interface (GUI) for viewing and managing contacts stored within the stationery service contacts database 210 according to one embodiment of the invention. The GUI includes a first region 810 for listing various contact groups; a second region 811 for listing contacts and/or households associated with the currently selected group; and a third region 812 for performing operations related to selected contacts and/or households. As mentioned above, the groups listed within the GUI include an "all contacts" group 801, user-specified groups 802 and one or more "smart groups" 803 which are automatically generated by the stationery service contacts manager 212. The smart groups 803 are groups of contacts and/or households arranged according to upcoming chronological events. For example, in FIG. 8, the smart groups include a "reminders" group which includes reminders for contacts and/or households arranged in chronological order; an "upcoming birthdays" group comprised of contacts arranged in order of upcoming birthdays; an "anniversaries" group comprised of contacts arranged in order of upcoming anniversaries; and a "recent purchases" group comprises of contacts arranged in an order of stationery purchases made by the end user. By way of example, when the "upcoming birthdays" group is selected in region 810, a listing of contacts is provided in region 811 in a chronological order of upcoming birthdays (e.g., with the contact with the first upcoming birthday at the top of the list). In one embodiment, the end user is provided with the ability to add smart groups based on any date-based variable associated with the contacts database. Other types of smart groups may include "requested addresses" containing a listing of those contacts for whom mailing addresses have been requested (as described below); a "recently confirmed" smart group containing a listing of those contacts who have responded and confirmed their addresses; and a "last import" smart group comprised of those contacts included in the last contacts import.

Figure 9:
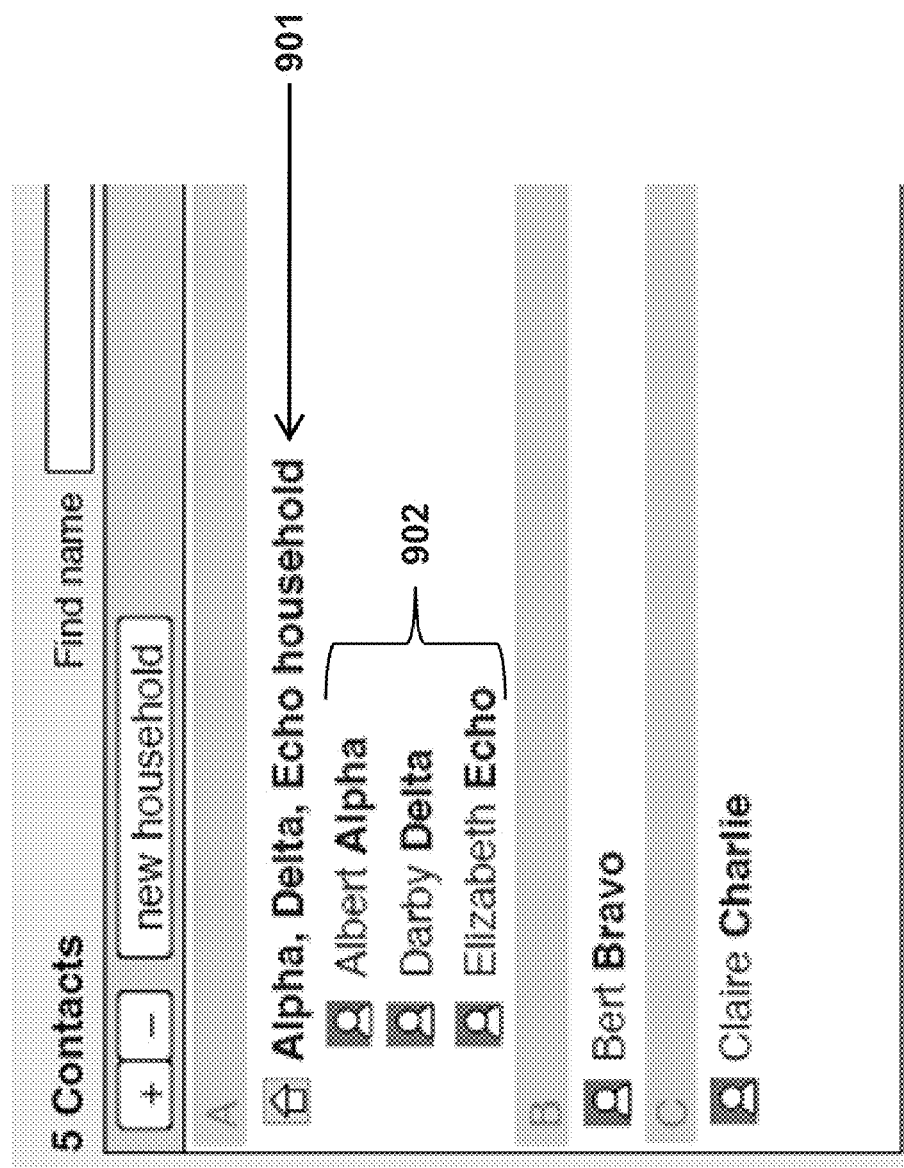
FIG. 9 illustrates households comprised of multiple contacts according to one embodiment of the invention.

Multiple contacts and/or households may be highlighted in region 811 (e.g., by holding CTRL and selecting with a mouse) and processed by selecting options in region 812. For example, a drop-down menu of available groups 823 allows the user to associate the highlighted contacts with a group. An export button 821 allows the user to export the contacts to a file (e.g., a CSV or vCard file). A "merge into household" button 820, when selected, allows the end user to create a new household comprised of the selected contacts. Upon selection of this button, the end user is presented with a field for entering a new household name. As illustrated in FIG. 9, once a new household is created, the household 901 is displayed within the second region 811 of the GUI along with other contacts and/or households. As illustrated, the contacts 902 associated with the household are displayed beneath the household entry 901 and indented.

Figure 10:
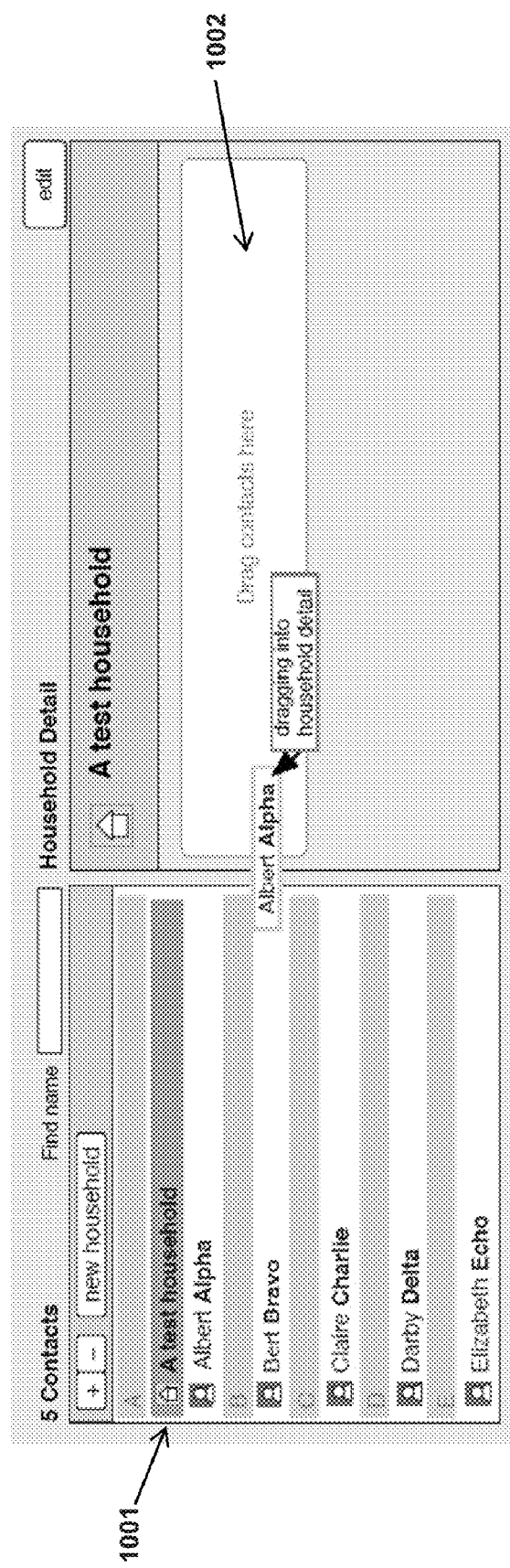
FIG. 10 illustrates one embodiment of a GUI for incorporating contacts into households.

As illustrated in FIG. 10, in one embodiment of the GUI, when a household entry 1001 is selected from within the second region 811 of the GUI, contacts listed in the second region may be clicked on and dragged into a household detail region 1002 to add the contacts to the household. Multiple contacts may be selected by selecting the CTRL key and highlighting the contacts with a mouse or other cursor control device.

Figure 11:
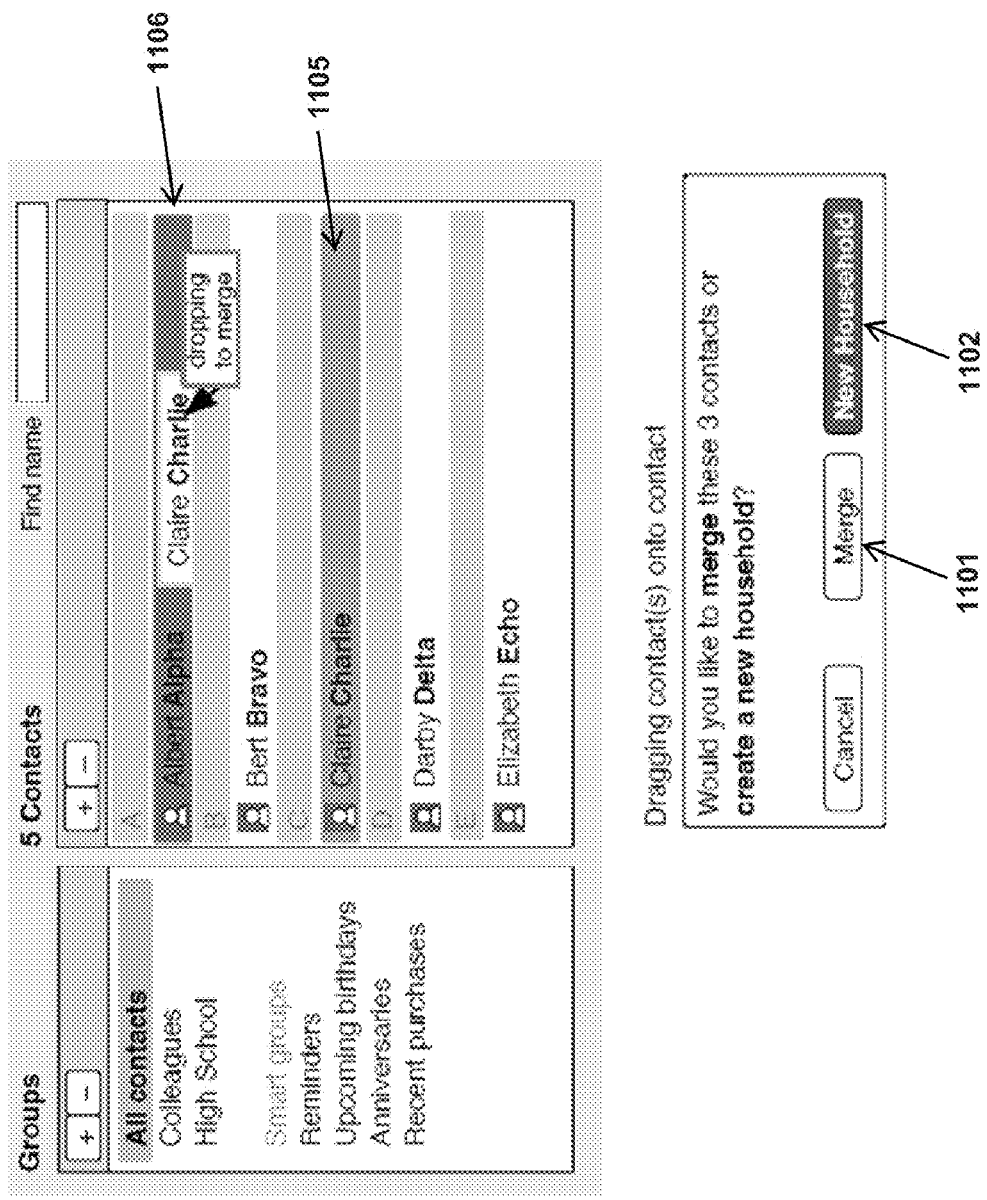
FIG. 11 illustrates another embodiment of a GUI for incorporating contacts into households and/or merging contacts.

As illustrated in FIG. 11, in one embodiment, a user may select one or more contacts 1105 (e.g., by holding down the CTRL key) and drag the contacts over another contact 1106 in the contact list. Doing so will provide the user the option to either merge the contacts (by selecting a merge button 1101) or to create a new household with the contacts (by selecting a "new household" button 1102).

Returning to FIG. 8, region 812 also includes a selectable option to "send cards" to the contacts selected in region 811. Selecting this option causes the stationery personalization engine 220 to begin the stationery design process using contacts identified by the stationery service contacts manager 212 (e.g., starting at step 309 in FIG. 3). For example, the user will be provided to option to select a stationery template and enter a default message and/or a personalized message for certain contacts. After the mail order is completed, the print module 250 will transmit the stationery order to one of the internal printers 251 or the external print service 252 and, after printing, the stationery order will be mailed to the selected contacts.

Figure 12:
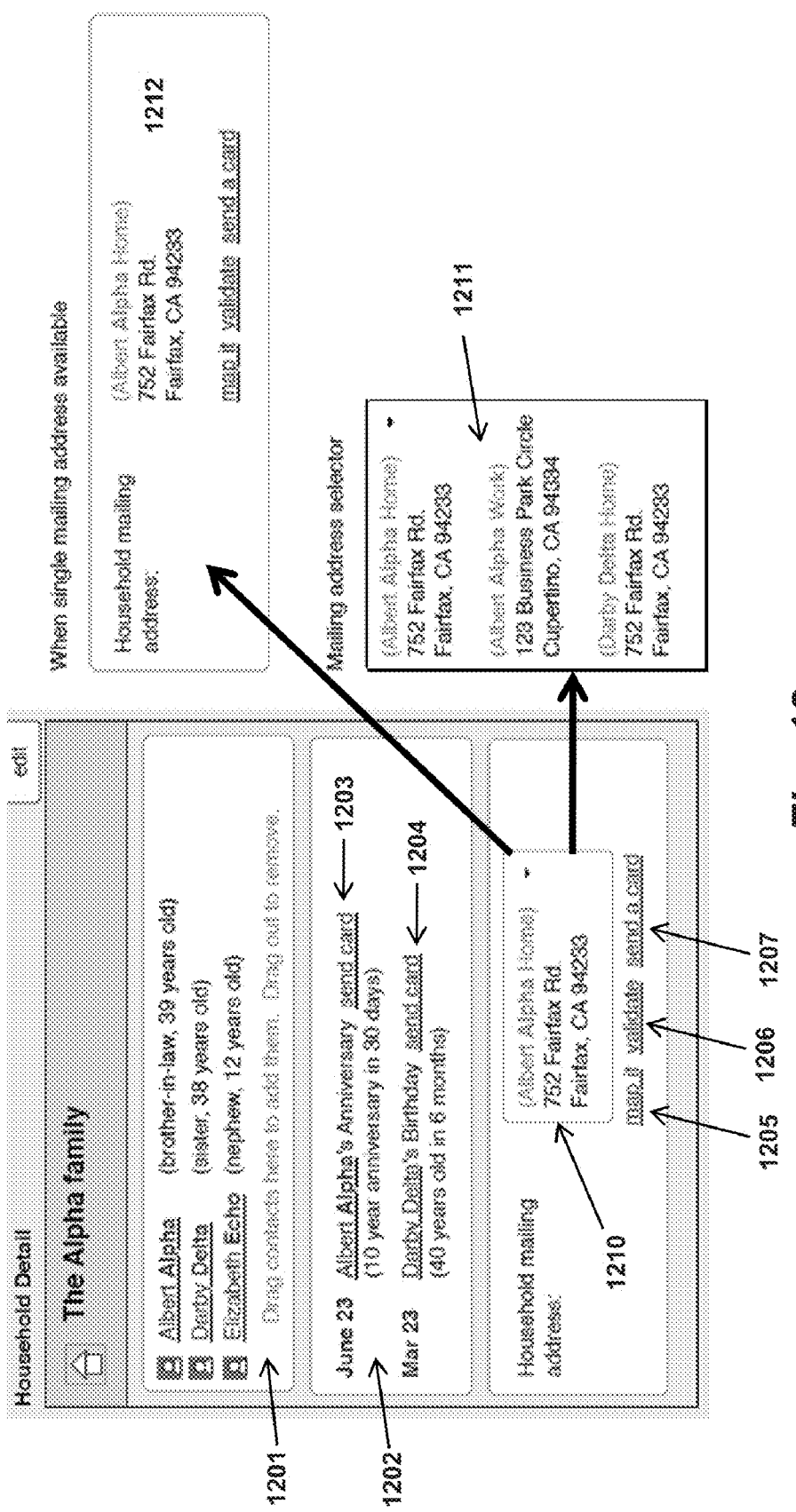
FIG. 12 illustrates a window displaying household details according to one embodiment of the invention.

FIG. 12 illustrates one embodiment of a household details window which is generated by, for example, double-clicking on the household within the contacts/households region 811. The window includes a first region 1201 for listing the contacts within the household, with hyperlinks linking to each of the contacts, a second region 1202 for displaying upcoming dates associated with the members of the household (as well as links 1203, 1204 for sending a card to each of the household members). In addition, a drop-down menu 1210 is provided which is automatically populated with all of the different addresses associated with each of the household members. As shown at 1211, each entry in the drop-down menu includes an address, an indication of the contact associated with the address and a classification of the address type (e.g., work, home, etc). Links 1205-1207 are provided and dynamically updated for each address to map the address 1205 (e.g., by linking to Google Maps); to validate the address 1206 (as described herein); and to send a card 1207 (as described herein). In circumstances where a single address is associated with all of the household members, the drop-down is not provided as indicated at 1212.

Figure 13:
FIG. 13 illustrates a window displaying contact details according to one embodiment of the invention.
Figure 14:
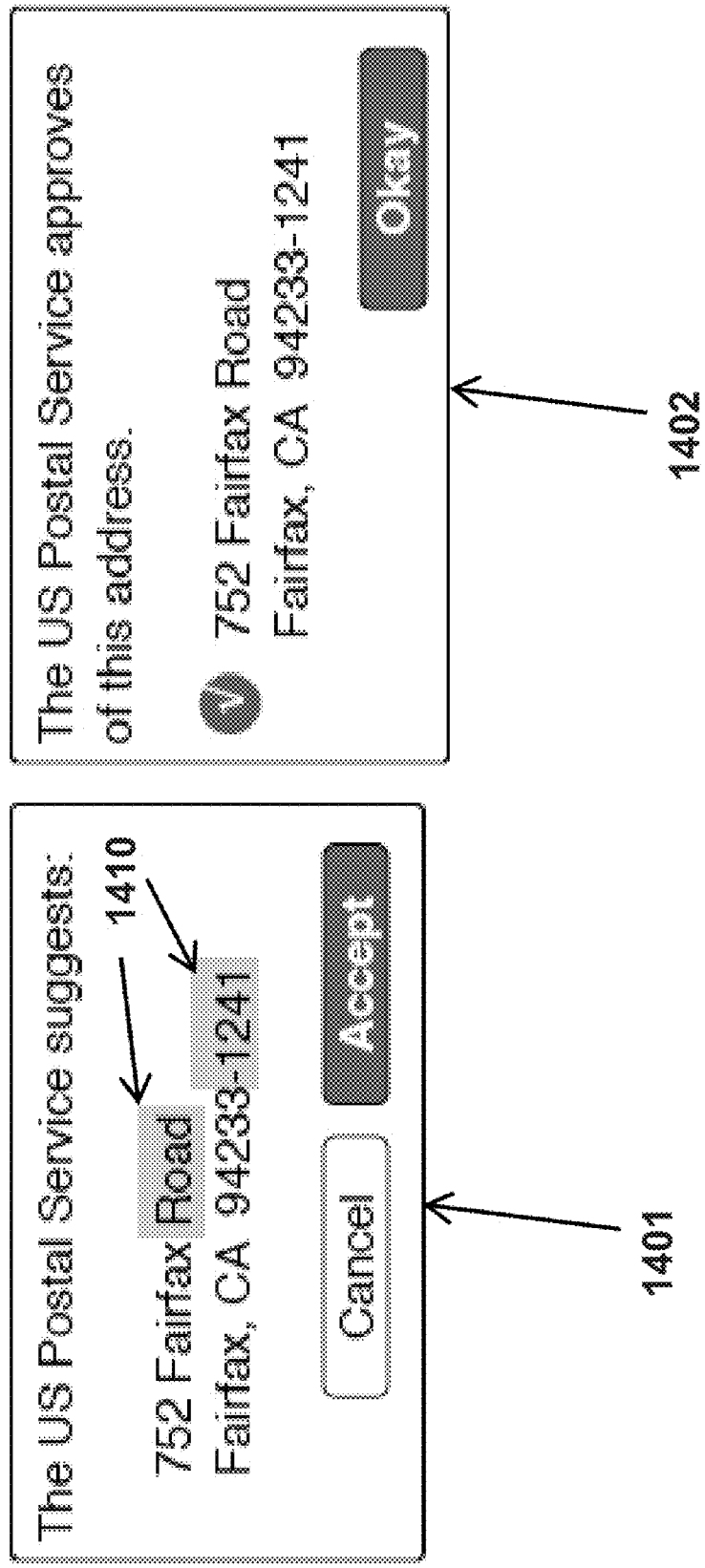
FIG. 14 illustrates windows for confirming mailing addresses according to one embodiment of the invention.

FIG. 13 illustrates a window for displaying and manipulating contact details according to one embodiment of the invention. In one embodiment, the contact details window is generated in response to a user double-clicking on a contact in region 811. Multiple addresses are provided for the contact and, for each address, a link is provided to "validate" the address 1301 and 1303. In one embodiment, to validate the address, the stationery service contacts manager 212 transmits a query containing the current address to an address validation service such as those available from the US postal service (USPS). As illustrated in FIG. 14, in one embodiment, in response to selection of the "validate" link, the USPS either suggests corrections, as indicated by highlighted regions 1410 of selection box 1401 or validates the address, as indicated in selection box 1402.

In addition, a "send card" link 1302, 1304 is provided for each address in the contact details window which initiates the process of selecting, designing and mailing stationery for the contacts associated with the address (e.g., as described above with respect to the "send card" button in region 812 of FIG. 8).

In addition, a "reminder" region 1315 is provided within the contact details window to provide reminders of upcoming dates such as birthdays and anniversaries for contacts within the user's contacts list. The layout within the region comprises an indicator of the type of reminder (e.g., birthday), followed by the date of the reminder, followed by a brief description (e.g., 40 years old in 6 months). In one embodiment, certain contact data such as birthdays and anniversaries are identified by the stationery service contacts manager 212 as reminders. In addition, links are provided 1305, 1307 to configure automated reminders for the end user. For example, in one embodiment, upon setting a reminder for a particular event, the stationery service contacts manager 212 will transmit an email, instant message, or SMS message to remind the end user of the event and/or will update the user's calendar with the event. Various other types of reminders may be employed while still complying with the underlying principles of the invention. In addition, for each reminder, a "send card" link 1302, 1304 is provided to initiate the process described above to design and mail stationery to the contact associated with the reminder.

In addition, a purchase history region 1320 is provided within the contact details window to display the recent purchase history of the end user. As illustrated, entries within the purchase history include images of the stationery designs 1309 and 1310 recently purchased by the end user, along with an indication of the stationery type and message, and the date that the stationery was purchased.

Figure 15:
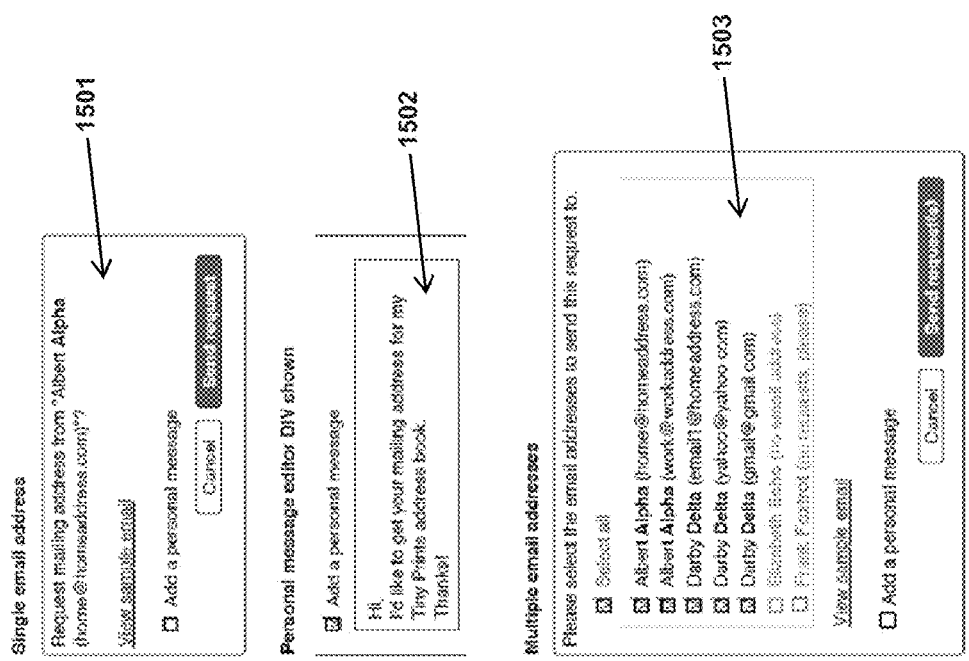
FIG. 15 illustrates GUI features employed in one embodiment of the invention for sending address request email messages.

In addition to using the address validation techniques described above, one embodiment of the invention confirms current mailing addresses by transmitting email messages to contacts. As illustrated in FIG. 15, in response to the selection of a particular contact, a window 1501 is presented asking the end user if an email request should be sent. A default request message is used unless the user selects the checkbox for adding a personal message. If this checkbox is selected a window such as 1502 appears to allow the user to enter a personal message. In one embodiment, upon selection of "add a personal message" check box, the message field is pre-populated with the default message, which may then be edited by the user.

A GUI for selecting multiple contacts is illustrated at 1503. In this embodiment, contacts to receive the email request are selected via check-boxes. In one embodiment, certain contacts who have specifically asked not to receive requests and/or for whom the user does not have an email address are grayed out (thereby preventing selection via a checkbox). User selection of a "send request(s)" button from 1503 or a "send request" button within window 1501 will cause the confirmation request email to be sent to the selected contacts.

Both window 1501 (for a single request) and 1503 (for multiple requests) include a "view sample email" link to display a sample request email. The sample request email may be displayed in a new window, a new DHTML layer, or as an in-line DIV (division).

Figures 16A, 16B:
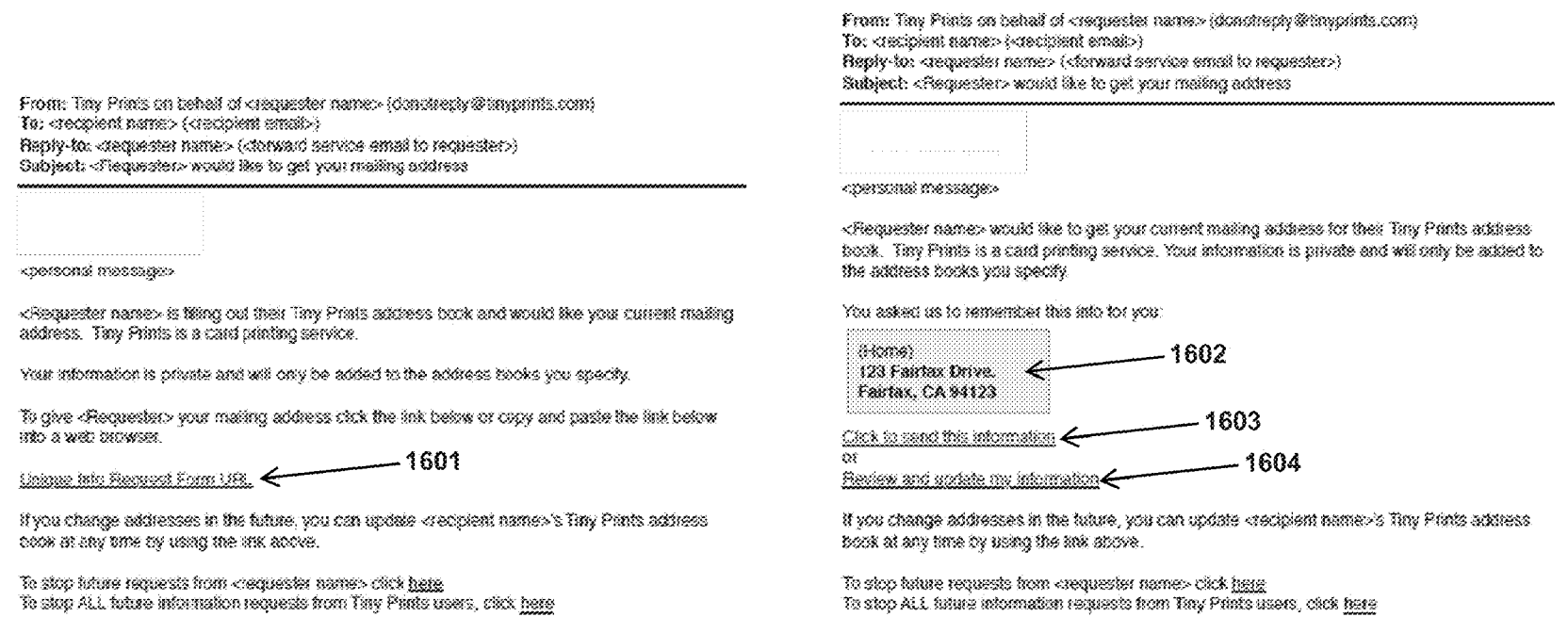

FIG. 16*a* illustrates one embodiment of a confirmation request email to be sent to contacts for whom no address currently exists in the user's address book. A hyperlink 1601 may be selected from within the email message to open a Web page on the online stationery service 200 and enter the contact's address information. In one embodiment, the URL 1601 is unique for each individual contact (e.g., containing a sequence of characters uniquely identifying the contact to whom the email was sent).

FIG. 16*b* illustrates one embodiment of a confirmation request email to be sent to contacts for whom an address currently exists on the online stationery service 200. In this embodiment, the address which is stored on the online stationery service 200 is provided within the body of the email 1602. A first hyperlink 1603 is provided to allow the contact to confirm that the address information is correct and a second hyperlink 1604 is provided to allow the contact to review and update the address information and/or other personal information related to the contact. Selection of the first hyperlink 1603 generates a thank you message indicating that the current address information has been confirmed and selection of the second hyperlink 1604 generates a series of data entry fields within a Web page for the user to update the address information. In one embodiment, the data fields are pre-populated with the existing address information.

Figure 17:
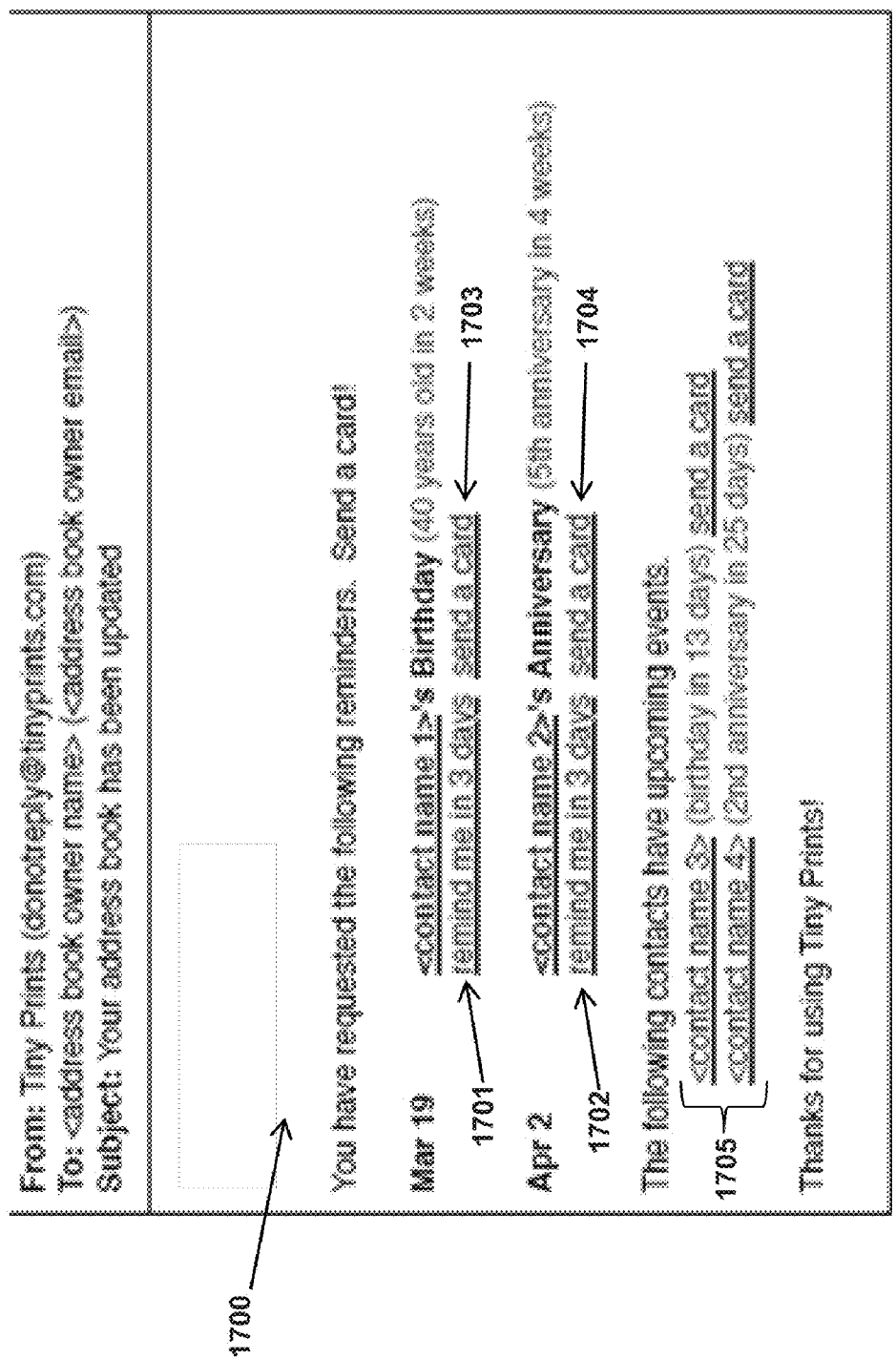
FIG. 17 illustrates reminder emails transmitted to an end user according to one embodiment of the invention.
Figure 18:
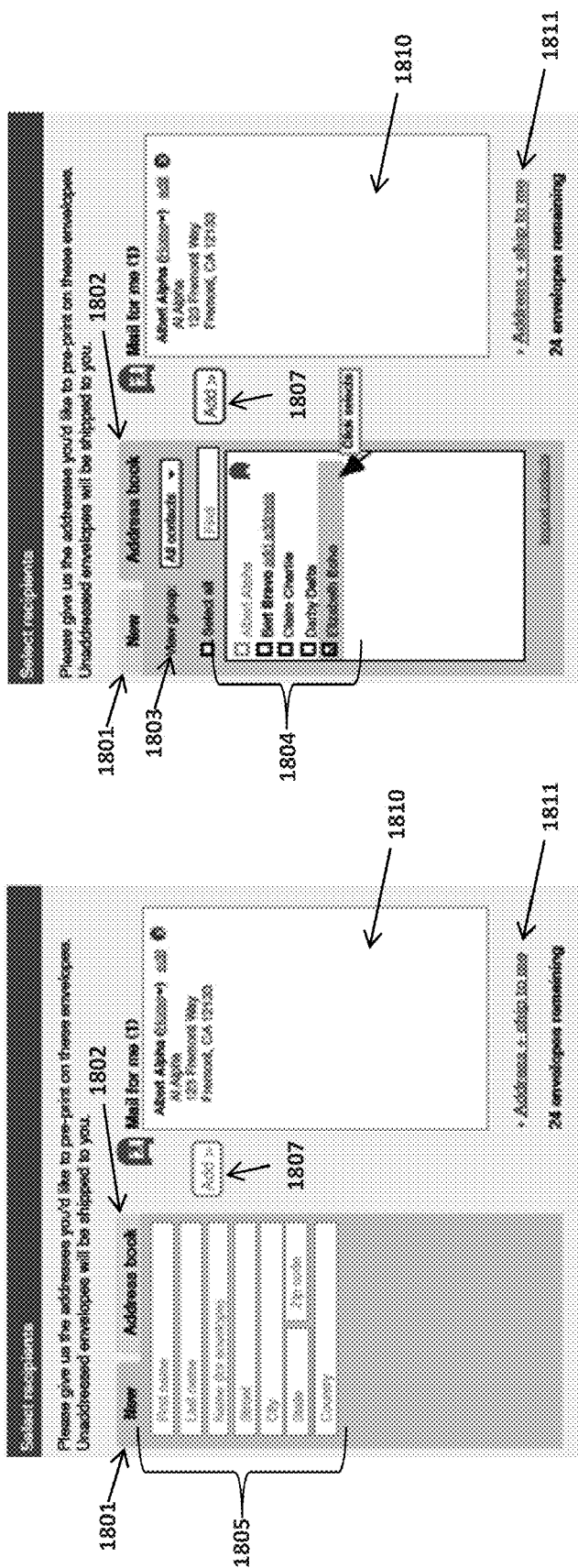
FIGS. 18a-b illustrate GUI features employed in one embodiment of the invention for selecting new addresses and addresses from within a contacts list.

In addition to providing reminders within the address book window shown in FIG. 8 and the contact details window shown in FIG. 13, one embodiment of the stationery service contacts manager 212 will automatically generate reminder emails for the end user. FIG. 17 illustrates one such reminder email in which upcoming dates are listed in chronological order and, for each reminder, links are provided to generate a subsequent reminder 1701-1702 (e.g., "remind me again in 3 days"). In addition, for each reminder, a "send a card" link 1703-1704 is provided which, when selected, initiates the stationery design process on the online stationery service 200 for the associated contact(s) (as described above). In addition, a secondary listing 1705 is provided for those contacts for which the user has not specifically requested a reminder.

Figure 19:
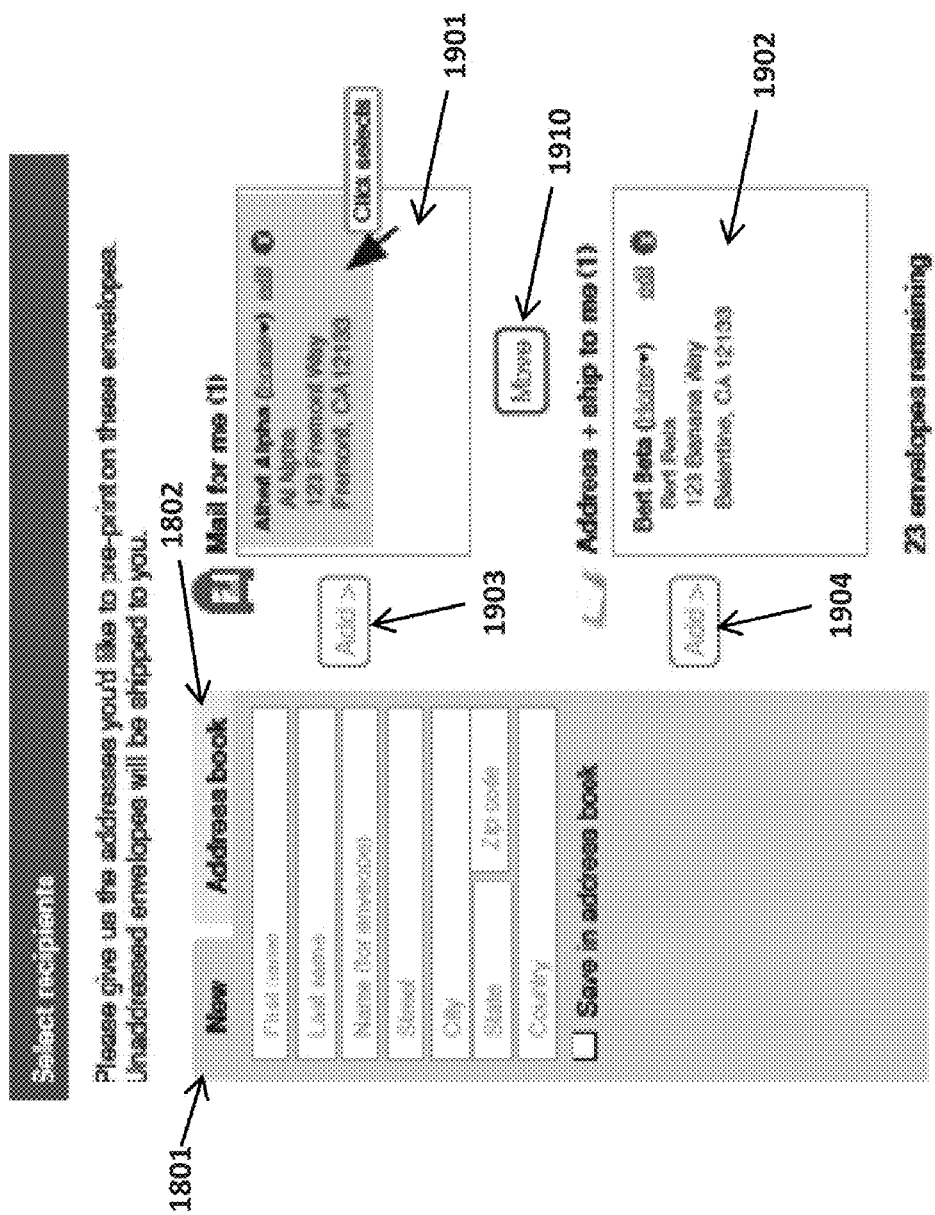
FIG. 19 illustrates GUI features employed in one embodiment of the invention for selecting options for directly mailing stationery to contacts and for mailing stationery to the end user of the stationery service.

As mentioned above, in one embodiment of the invention, the online stationery service 200 will mail stationery to selected contacts on behalf of the end user. FIGS. 18*a-b* illustrate one embodiment of the invention for selecting contacts for a stationery mailing. Two tabs 1801-1802 are provided for specifying contacts. The first tab 1801 generates a series of data entry fields 1805 for specifying a new contact name and address (for someone not found in the user's address book). The second tab 1802 provides a list of selectable contacts 1804 from the user's address book 210. A drop-down menu 1803 is provided to select specific groups of contacts to be displayed within the list 1804. Individual contacts within the list 1804 are selected via check boxes, as illustrated. Regardless of whether the contacts are entered manually or selected from the address book, the user selects an "add" button 1807 to add the contact information to the set of contacts for the stationery order. Contacts may be added to one of two different groups: a "mail for me" group 1810 which includes contacts to whom the online stationery service 200 will mail stationery directly; and a "address+ship to me" group 1811 which includes contacts for whom the online stationery service will print stationery/envelops and then mail the order to the end user. In FIGS. 18*a-b*, the "mail for me group" is opened, thereby displaying those contacts selected for a direct-mail option. The "address+ship to me" group may be displayed in a similar manner upon selection of a hyperlink 1811, as illustrated in FIG. 19. Specifically, in FIG. 19, two separate lists are compiled: a "mail for me" list 1901 and a "address+ship to me" list 1902. Contacts may be added to each of the lists via two corresponding add buttons 1903 and 1904. In addition, contacts may be moved between the lists by highlighting a contact from one of the lists and selecting a "move" button 1910.

Thus, within the GUI shown in FIGS. 18*a-b* and 19, two different options 1801-1802 are provided for selecting contacts and two different delivery options ("mail for me" or "address+mail to me") are provided for delivering the stationery order.

Figure 20A:
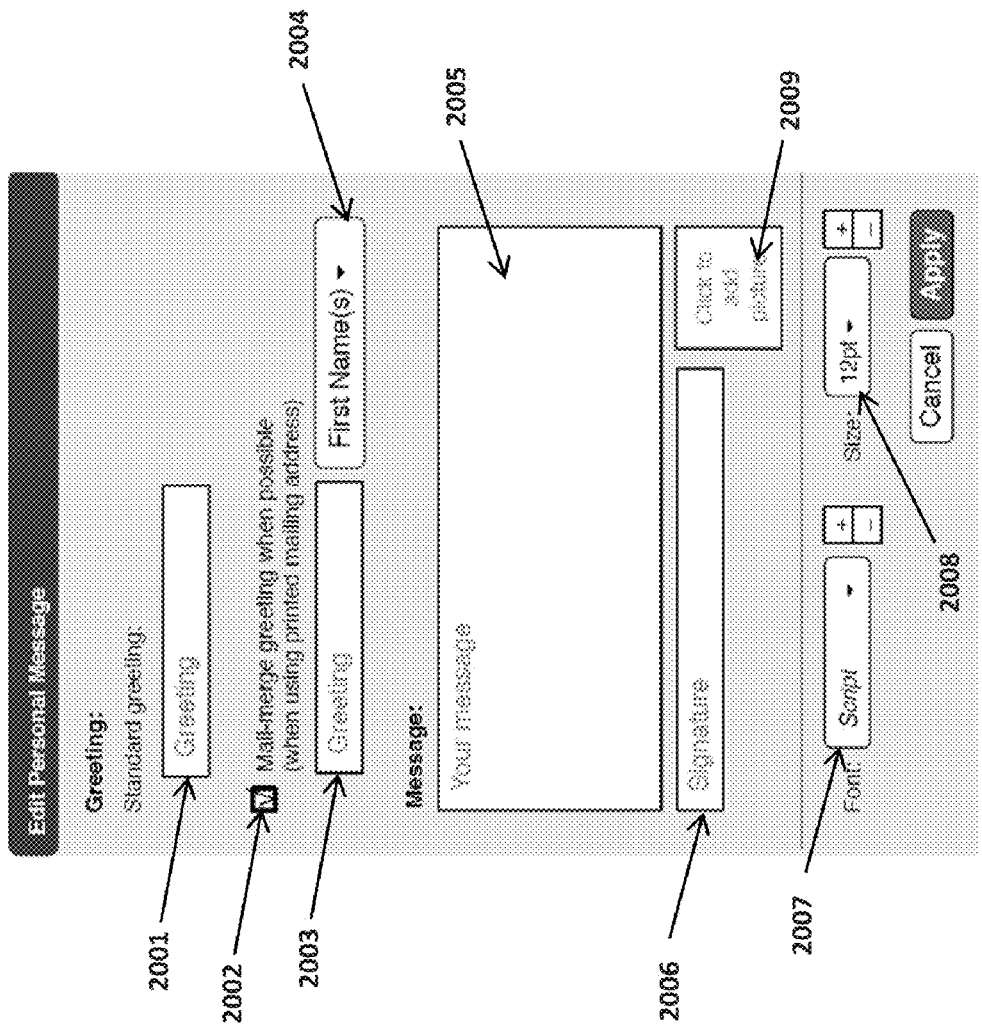
FIGS. 20a-c illustrate GUI features for selecting default and custom messages to be printed on stationery and mailed contacts within an address book.

As mentioned above, one embodiment of the invention allows the end user to specify a default message and/or to enter personalized messages for each contact. FIG. 20*a* illustrates one embodiment of a Web-based GUI for specifying a default message. A greeting field 2001 is provided for entering a default greeting (e.g., "Hi," "Hey," "Dear," etc) and a selectable option 2002 is provided to mail merge the greeting when possible (e.g., using contact information from the user's address book 210). For mail merge, a drop down menu 2004 is provided to indicate whether the first or last name of the contact should be used. "First name" is selected in FIG. 20*a*, indicating that the greeting will be placed in front of the first name of the stationery recipient (e.g., "Hey Albert"). A message field 2005 is provided for entering a default message and a signature field 2006 is provided for entering a default signature (e.g., "Best Regards, Tom"). In addition, options are provided for entering a picture 2009; selecting a default font 2007; and selecting a default font size 2008.

Figure 20B:
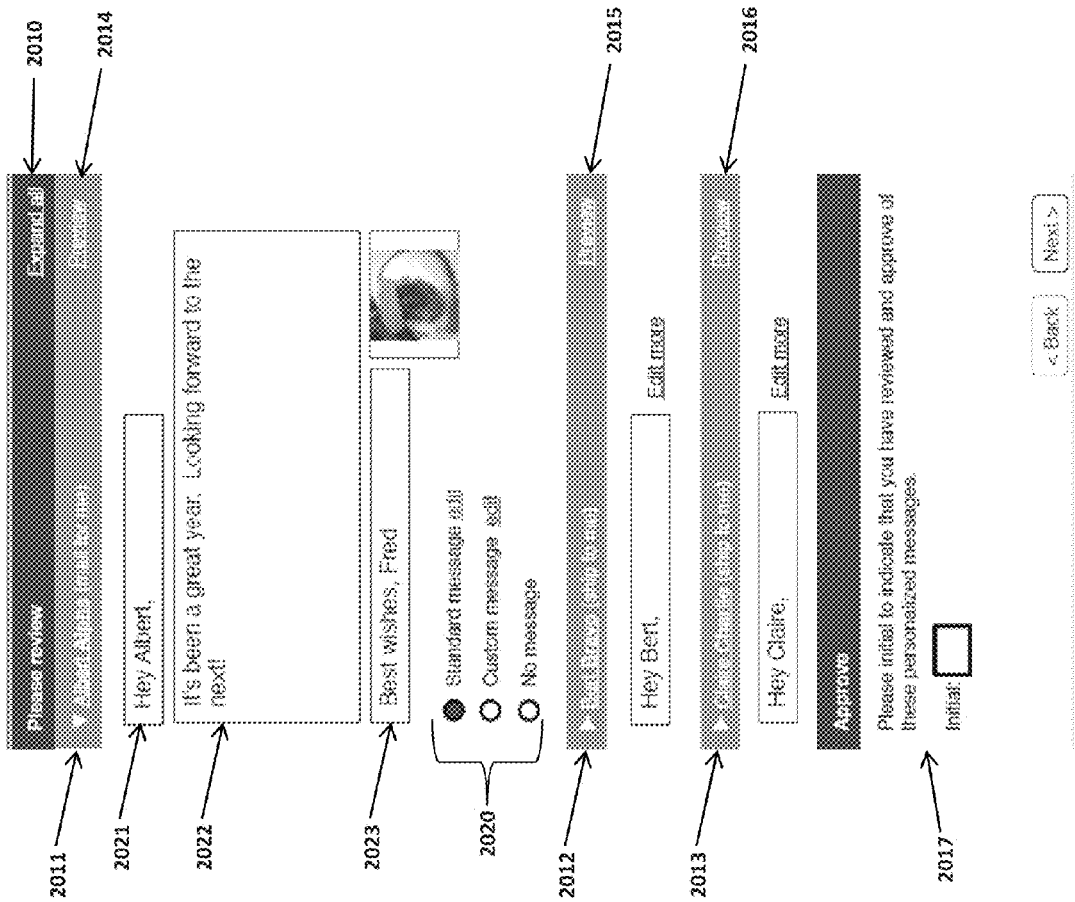
Figure 20C:
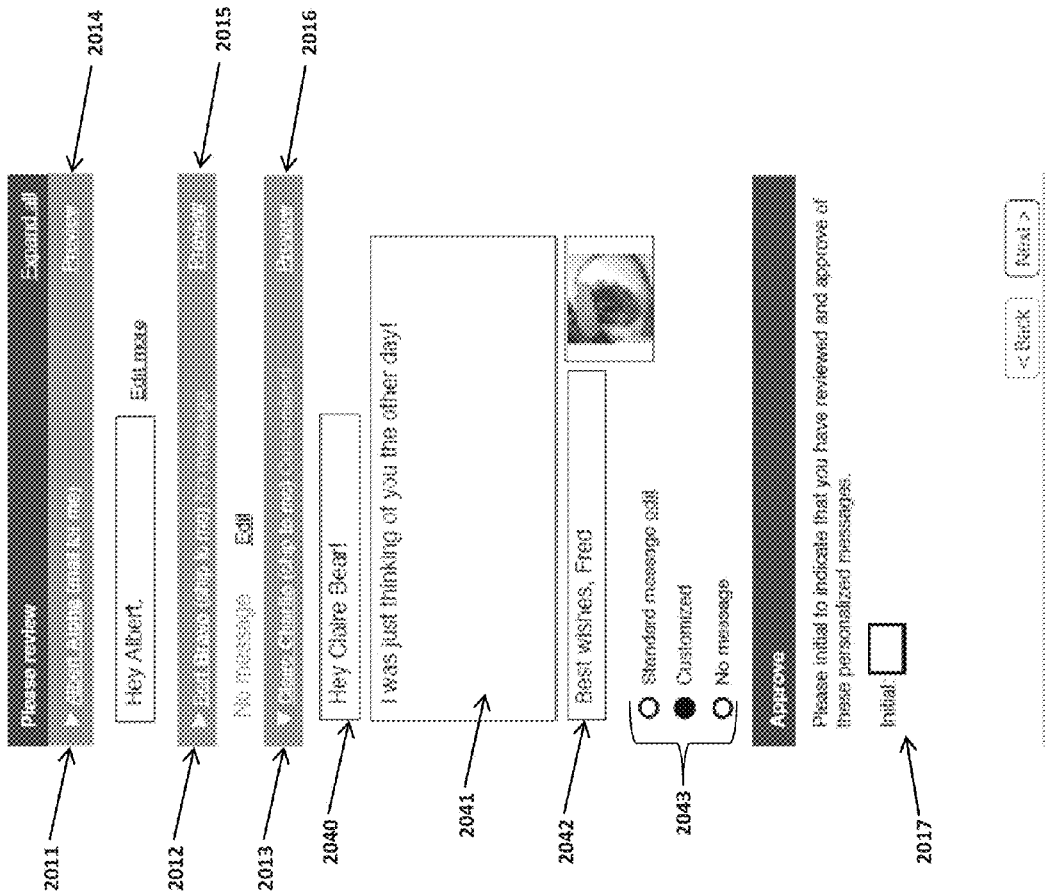

FIGS. 20*b-c* illustrate a GUI for reviewing the messages associated with each of the contacts prior to printing and mailing. A separate contact entry 2011-2013 is provided for each contact. A "preview" link associated with each contact entry allows the end user to preview the current greeting 2021, message 2022 and signature 2023 for each contact. The preview for contact 2011 is illustrated in FIG. 20*b* and the preview for contact 2013 is illustrated in FIG. 20*c*. For each contact entry, radio selection options 2020 are provided to allow the user to select the "standard message," a "custom message," or "no message." In the illustrated example, a standard greeting, message, and signature is selected for contact 2011 and a custom greeting, message, and signature is provided for contact 2013. From the preview GUI, the user may edit each of the messages directly (e.g., by placing a cursor within data entry fields 2040, 2041 or 2042). All of the contact entries may be opened and displayed via an "expand all" link 2010. Following the review of all greetings, messages and signatures, an approval region is provided in which the user enters his/her initials 2017 to approve the final results.

Figure 21:
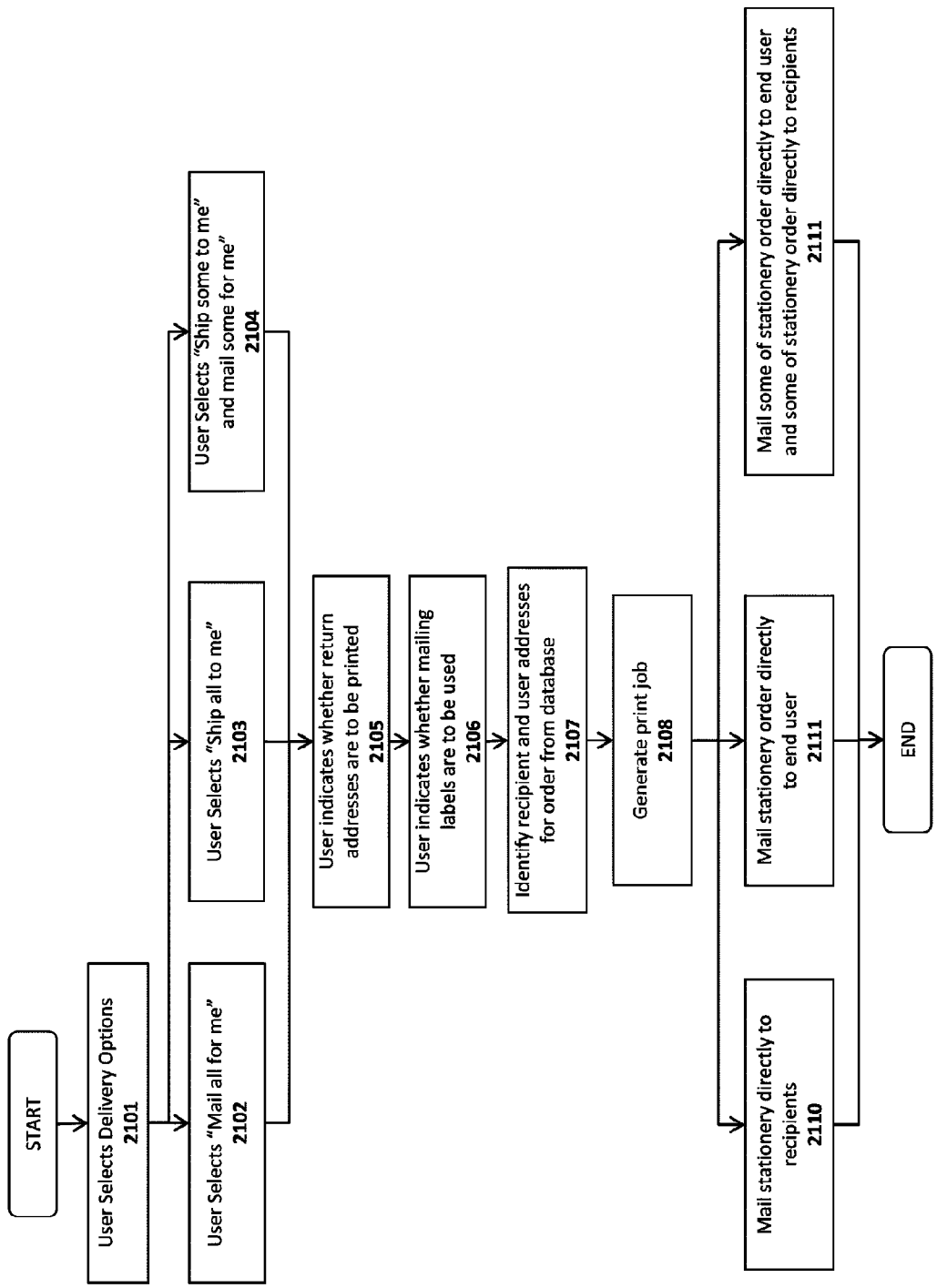
FIG. 21 illustrates a method according to one embodiment of the invention for processing a stationery order.

A method for selecting stationery purchase options according to one embodiment of the invention is illustrated in FIG. 21. In one embodiment, the method is implemented within the context of the GUI and system described above.

At 2101, after selecting a set of recipients from the user's address book and selecting a personalized and/or default message for each recipient, a user selects stationery delivery options. In one embodiment, the options include "mail all for me" 2102 indicating that the stationery service will be responsible for printing and mailing the stationery order directly to recipients; "ship all to me" 2103 indicating that the stationery service will print and ship the order directly to the end user; and "ship some for me and mail some for me" 2104 indicating that the stationery service will be responsible for printing and mailing a portion of the stationery order directly to recipients and will ship the remainder of the order to the end user.

At 2105, the user indicates to the stationery service whether return addresses are to be printed on envelopes. At 2106, the user indicates whether mailing labels are to be used. At 2107, the stationery service identifies the recipient and user addresses from its database and, at 2108, generates a print job to print the stationery and envelopes containing the addresses according to the user's specified preferences (e.g., using mailing labels, return addresses, etc). The stationery order (stationery and envelopes) is then printed.

At 2110, if the user selected "mail all to me" 2102, then the stationery service mails the stationery directly to the recipients. At 2111, if the user selected "ship all to me" then the stationery service ships the stationery order directly to the end user. At 2112, if the user selected "ship some to me and mail some for me" then the stationery service mails some of the stationery order to recipients on behalf of the user and ships the remainder of the stationery order to the end user.

In one embodiment, the stationery order is generated and sent to a printing service as described in the co-pending US patent application entitled SYSTEM AND METHOD FOR PROCESSING PERSONALIZED STATIONERY DESIGNS AND SELECTING FULFILLMENT ORDER SITES, Ser. No._____, filed concurrently with the present application and incorporated herein by reference.

Throughout the discussion above, various details have been omitted to avoid obscuring the pertinent aspects of the invention. For example, in an embodiment of the invention in which the user connects to the online stationery service 200 via a Web browser, various well known functional modules associated within the presentation and session management logic 206 shown in FIG. 2 are executed to receive input, process the input and dynamically generate Web pages containing the results. The Web pages described herein may be formatted according to the well known HyperText Markup Language ("HTML") or Extensible HTML ("XHTML") formats, and may provide navigation to other Web pages via hypertext links. One embodiment utilizes Dynamic HTML ("DHTML"), a collection of technologies used together to create interactive Web sites by using a combination of a static markup language (e.g., HTML), a client-side scripting language (e.g., JavaScript), a presentation definition language (e.g., CSS), and the Document Object Model ("DOM"). Of course, the underlying principles of the invention are not limited to any particular set of protocols or standards.

In one embodiment, the Web server used to implement the embodiments of the invention is a Ngnix, Apache web server running on Linux with software programmed in PHP using a MySQL database.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A system implemented within an online stationery service, the system comprising at least one memory for storing program code and at least one processor for processing the program code to execute:
    a stationery service contacts manager to manage a set of contacts data within a stationery service contacts database in response to user input;
    a stationery personalization engine logic configured to provide an end user with a set of selectable stationery templates, the stationery personalization engine receiving an indication that an end user has selected a particular one of the stationery templates, and generating personalized stationery with the selected template based on user input;
    presentation logic configured to generate a graphical user interface (GUI), the presentation logic communicatively coupled to the stationery service contacts manager to receive a listing of contacts from the stationery service contacts manager to whom the personalized stationery is to be mailed, the graphical user interface comprising:

a first region for displaying the listing of contacts received from the stationery service contacts manager, the contacts within the listing of contacts selectable via a user input device;

a second region comprising a series of data fields for entering a new contact via a user input device;

a third region displaying a list of contacts to whom the online stationery service is to mail stationery directly on behalf of the end user, the contacts within the third region selected from the first region or entered in the second region; and a fourth region displaying a list of contacts for whom the online stationery service is to print and mail stationery for the end user, the contacts within the fourth region selected from the first region or entered in the second region; and a print module to generate a print job to print the personalized stationery and envelopes containing the address information for the user-selected contacts.

2. The system as in claim 1 wherein the GUI comprises a Web page generated by the presentation logic and transmitted to the end user, the Web page rendered within a browser on the end user's computer to generate the GUI.

3. The system as in claim 1 further comprising:
a first tab visually coupled to the first region; and
a second tab visually coupled to the second region,
wherein the first region is selectable by the end user by selecting the first tab and the second region is selectable by the end user by selecting the second tab.

4. The system as in claim 3 wherein the first region and the second region occupy overlapping space within the GUI, and wherein, upon selection of the first tab by the end user, the first region is displayed and the second region is not displayed, and wherein upon selection of the second tab by the end user, the second region is displayed and the first region is not displayed.

5. The system as in claim 1 wherein the first region comprises a check box associated with and adjacent to each contact in the contact listing, wherein the user may select a plurality of contacts from the listing by selecting the corresponding check boxes.

6. The system as in claim 1, wherein the third and fourth regions are displayed concurrently and further wherein each of the third and fourth regions has an "add" graphical element associated therewith to add users from the contacts list in the first region or a contact entered within the data fields of the second region to the list of contacts to whom the online stationery service is to mail stationery directly on behalf of the end user in the third region or to the list of contacts for whom the online stationery service is to print and mail stationery to the end user in the fourth region.

7. The system as in claim 6 further comprising a "move" graphical element to move a selected contact within the third region to the fourth region or to move a selected contact within the fourth region to the third region.

8. A system implemented within an online stationery service, the system comprising at least one memory for storing program code and at least one processor for processing the program code to execute:

a stationery service contacts manager to manage a set of contacts data within a stationery service contacts database in response to user input;

a stationery personalization engine providing an end user with a set of selectable stationery templates, the stationery personalization engine receiving an indication that an end user has selected a particular one of the stationery templates, and generating personalized stationery with the selected template based on user input;

wherein the stationery personalization engine allows an end user to enter a default message to be used on stationery for a first set of contacts and one or more personalized messages to be used on stationery for a second set of contacts;

presentation logic for generating a graphical user interface (GUI), the presentation logic communicatively coupled to the stationery service contacts manager to receive a listing of contacts from the stationery service contacts manager to whom the personalized stationery is to be mailed, the graphical user interface comprising a listing of contacts to receive the personalized stationery, wherein each entry in the listing includes an option for selecting either the default message or a personalized message for the corresponding contact, wherein the GUI further comprises a final review listing of all contacts selected for a stationery mailing, the final review listing comprising, for each contact, data entry fields showing a personalized or default greeting, a personalized or default message, and a personalized or default signature, the greeting, message, and signature editable by the end user, wherein each entry in the final review listing includes an indication as to whether the stationery is to be mailed directly to the contact or shipped to the end user, wherein the indication is selectable and modifiable by the end user; and a print module to generate a print job to print the personalized stationery and envelopes containing the address information for the user-selected contacts.

9. The system as in claim 8 wherein the option for selecting the personalized message comprises a data entry field for entering a personalized message for the corresponding contact.

10. The system as in claim 8 wherein the GUI further comprises a greeting data entry field for entering a greeting and a drop-down menu for selecting a first or last name of a contact to be used on the stationery.

11. The system as in claim 10 wherein the GUI further comprises a signature data entry field for entering a signature for the stationery.

12. The system as in claim 8, wherein the final review listing includes, for each contact, a set of selectable radio buttons, a first radio button choosing a default message, a second radio button choosing a custom message and a third radio button choosing no message for the stationery to be sent to the selected contact.

13. The system as in claim 12 further comprising an edit link associated with an adjacent to the default message radio button and the custom message radio button, the edit link generating a GUI for editing either the default message or the custom message.

14. The system as in claim 8, wherein each entry in the final review listing includes a preview link which, upon selection, generates a preview image of a final stationery product to be sent to the associated contact.

* * * * *